United States Patent
Saha et al.

(10) Patent No.: US 12,079,251 B2
(45) Date of Patent: Sep. 3, 2024

(54) MODEL-BASED DETERMINATION OF CHANGE IMPACT FOR GROUPS OF DIVERSE DATA OBJECTS

(71) Applicant: SAP SE, Walldorf (DE)

(72) Inventors: Abhijnan Saha, Bangalore (IN); Anisha Asrani, Bangalore (IN)

(73) Assignee: SAP SE, Walldorf (DE)

( * ) Notice: Subject to any disclaimer, the term of this patent is extended or adjusted under 35 U.S.C. 154(b) by 44 days.

(21) Appl. No.: 17/961,071

(22) Filed: Oct. 6, 2022

(65) Prior Publication Data

US 2024/0119069 A1    Apr. 11, 2024

(51) Int. Cl.
*G06F 16/00*    (2019.01)
*G06F 16/28*    (2019.01)

(52) U.S. Cl.
CPC .................... *G06F 16/288* (2019.01)

(58) Field of Classification Search
None
See application file for complete search history.

(56) References Cited

U.S. PATENT DOCUMENTS

| | | | |
|---|---|---|---|
| 6,931,414 B1* | 8/2005 | Oh .................. | G06F 16/288 |
| | | | 707/999.102 |
| 2008/0140636 A1* | 6/2008 | Brodhun ............ | G06F 16/288 |
| 2020/0004848 A1* | 1/2020 | Wood ................ | G06N 5/022 |

* cited by examiner

*Primary Examiner* — Anhtai V Tran
(74) *Attorney, Agent, or Firm* — Klarquist Sparkman, LLP

(57) ABSTRACT

Techniques and solutions are provided for determining changes to computing objects based on a change to a related computing object. A model of model objects is created, where a model object represents a computing object of a plurality of computing objects. The model stores information about relationships between the plurality of computing objects. A change to a computing object of the plurality of computing objects is received, and the model is used to determine one or more objects of the plurality of computing objects that are affected by the change, using the relationship information in the model. At least a portion of the plurality of the objects are of differing types.

20 Claims, 18 Drawing Sheets

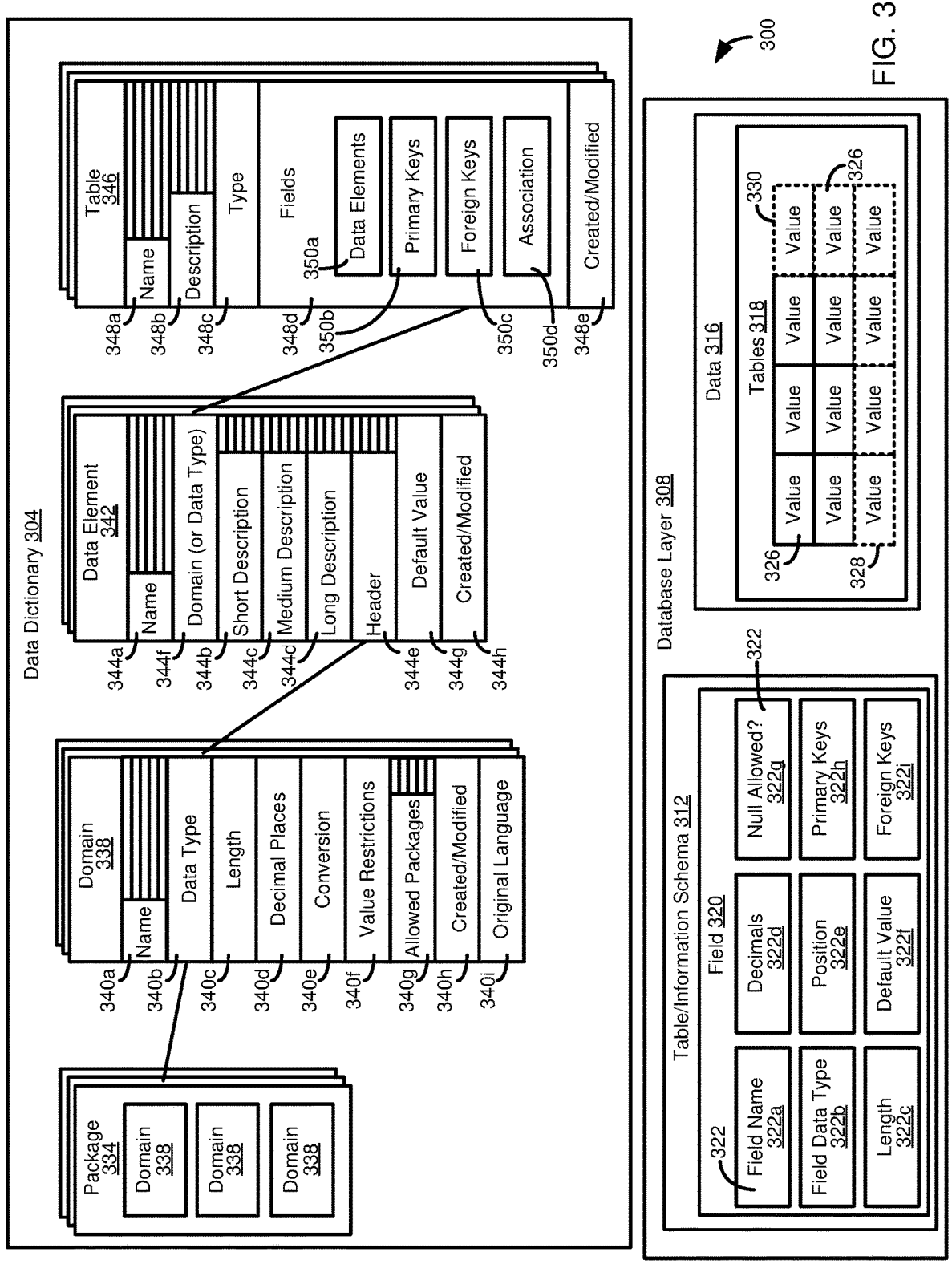

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'
@Analytics.dataCategory: #DIMENSION
@AccessControl.authorizationCheck: #CHECK
@Metadata.allowExtensions: true
@Search.searchable: true
define view I_SampleSalesOrder
  as select from    vbak
  left outer to one join vbkd on  vbak.vbeln = vbkd.vbeln
                              and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer               as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]   //Composition
  _Item,
  vbak.vkorg                                 as SalesOrganization,
  vbak.auart                                 as SalesOrderType,
  vbak.vtweg                                 as DistributionChannel,
  @ObjectModel.foreignKey.association: '_SoldToParty'
  vbak.kunnr                                 as SoldToParty,
  _SoldToParty,
  @DefaultAggregation: #SUM
  @Semantics.amount.currencyCode: 'TransactionCurrency'
  vbak.netwr                                 as TotalNetAmount,
  @Semantics.currencyCode: true
  @ObjectModel.foreignKey.association: '_TransactionCurrency'
  vbak.waerk                                 as TransactionCurrency,
  _TransactionCurrency,
  ...
}
where vbak.vbtyp = 'C';
```

FIG. 4

```
@AbapCatalog.sqlViewName: 'ISAMPLESO'
@EndUserText.label: 'Sample Sales Order'
@ObjectModel.compositionRoot: true
@ObjectModel.representativeKey: 'SalesOrder'       504
@Analytics.dataCategory: #DIMENSION
@AccessControl.authorizationCheck: #CHECK
@Metadata.allowExtensions: true
@Search.searchable: true
define view I_SampleSalesOrder
  as select from       vbak
    left outer to one join vbkd on  vbak.vbeln = vbkd.vbeln
                                and vbkd.posnr = '000000'
  association [0..*] to I_SampleSalesOrderItem as _Item
    on $projection.SalesOrder = _Item.SalesOrder
  association [0..1] to I_SampleCurrency as _TransactionCurrency
    on $projection.TransactionCurrency = _TransactionCurrency.Currency
  association [0..1] to I_SampleCustomer as _SoldToParty
    on $projection.SoldToParty = _SoldToParty.Customer
{
  @Search.defaultSearchElement: true
  key cast(vbak.vbeln as vdm_sales_order preserving type) as SalesOrder,
  @ObjectModel.association.type: [#TO_COMPOSITION_CHILD]      //Composition
  _Item,
  vbak.vkorg                                     as SalesOrganization,
  vbak.auart                                     as SalesOrderType,
  vbak.vtweg                                     as DistributionChannel,
  @ObjectModel.foreignKey.association: '_SoldToParty'
  vbak.kunnr                                     as SoldToParty,
  _SoldToParty,
  @DefaultAggregation: #SUM
  @Semantics.amount.currencyCode: 'TransactionCurrency'
  vbak.netwr                                     as TotalNetAmount,
  @Semantics.currencyCode: true
  @ObjectModel.foreignKey.association: '_TransactionCurrency'
  vbak.waerk                                     as TransactionCurrency,
  _TransactionCurrency,
  ...
}
where vbak.vbtyp = 'C';
```

```
@EndUserText.label: 'Auto assigned role for I_SampleSalesOrder'
@MappingRole: true
define role I_SampleSalesOrder
  grant select on I_SampleSalesOrder
  where ( SalesOrderType ) =
    aspect pfcg_auth ( v_vbak_aat,
                       auart,
                       actvt = '03' );
```
508

```
@Metadata.layer: #CORE
annotate view I_SampleSalesOrder
with
{
  @UI.lineItem: [{importance: #HIGH }]
  SalesOrder;
  @UI.lineItem: [{importance: #HIGH }]
  SalesOrderType;
}
```
512

```
@AbapCatalog.sqlViewAppendName: 'XINSAMPLEISO'
@EndUserText.label: 'Sales Order Extension India'
extend view I_SampleSalesOrder with X_IN_I_SampleSalesorder
{
  _SoldToParty.CustomerClassification
}
```
516

FIG. 5

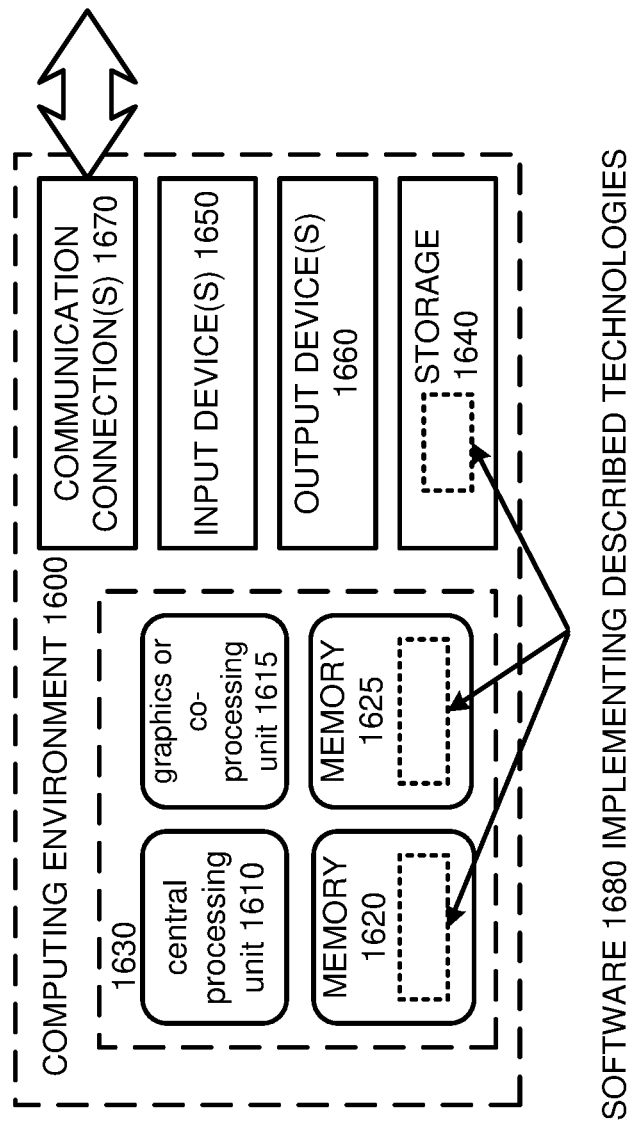

MODEL-BASED DETERMINATION OF CHANGE IMPACT FOR GROUPS OF DIVERSE DATA OBJECTS

FIELD

The present disclosure generally relates to modelling relationships between different types of objects. Particular implementations relate to using a model to determine the impact of a change to one modelled object on one or more other modeled objects.

BACKGROUND

Software systems are increasingly diverse and complex. For example, many software applications use stored data, which may be stored in a database, such as a relational database. However, accessing data in a relational database can be cumbersome for non-technical users, and it may be beneficial to add semantics and functionality to the database data that can be used by a variety of applications or application processes. In addition, it may not be desirable for many users to have direct access to data at the level of the database.

Accordingly, a variety of software layers can exist "above" the database level. Objects in these layers can refer to objects in lower-level layers, as well as referring to other objects in a same layer. A given object can be related to many objects, including many objects at a same level or many objects at higher or lower levels. Understanding how a change to a definition of a particular object, or data stored in, or accessible using, a particular object can affect other objects, and their data can be exceedingly complex.

For example, a data model may be so complex that a given user may not understand all of the relationships. Moreover, as noted above, the user may not even be aware that other layers exist. Software implementing one or more layers may be able to track some relationships between objects, such as objects in a database, but may not be able to track other relationships, or at least such functionality may not be easily accessible to users or other computing processes. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for determining changes to computing objects based on a change to a related computing object. A model of model objects is created, where a model object represents a computing object of a plurality of computing objects. The model stores information about relationships between the plurality of computing objects. A change to a computing object of the plurality of computing objects is received, and the model is used to determine one or more objects of the plurality of computing objects that are affected by the change, using the relationship information in the model. At least a portion of the plurality of the objects are of differing types.

In one aspect, the present disclosure provides techniques for identifying objects affected by a change to another object, using a model of a plurality of objects. A selection of a first data object instance of a first type is received. A first model object instance is instantiated, which represents the first data object instance. A selection of a second data object instance of a second type is received, where the second type is different than the first type. A second model object instance, representing the second data object instance, is instantiated.

One or more identifiers of a relationship between the first model object instance and the second model object instance are included in the first model object instance. A model that includes the first model object instance and the second model object instance, or identifiers thereof, is defined. The model is stored.

A change to the first data object instance is received. The model is retrieved. It is determined that the first data object instance is related to the second data object instance based on at least one of the one or more identifiers of the first model object instance. It is determined that a third data object instance is affected by the change to the first data object instance based at least in part on the model, where the third data object instance is the second data object instance or is a data object instance other than the second data object instance.

In another aspect, the present disclosure provides techniques for processing a request to determine changes to one or more data objects based on a change to another data object, using a model having model object instances. A change analysis request is received. The change analysis request identifies a model or at least one data object instance modelled by the model. The model includes a plurality of model object instances, a first model object instance of the plurality of model object instances representing a first data object instance and having one or more identifies of a relationship with a second data object instance modelled by a second model object instance.

A query is generated based at least in part on the change analysis request and the model, the query retrieving data from the first data object instance and the second data object instance. The query is caused to be executed, and query execution results are received. At least a portion of the query execution results, or data derived at least in part therefrom, are caused to be displayed to a user.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 a schematic diagram illustrating components of a data dictionary and components of a database layer.

FIG. 4 is code for an example metadata model for a database view of a virtual data model.

FIG. 5 is code for an example metadata model for a view of a virtual data model, and for metadata models which modify or refer to such example metadata model.

FIG. 16 is a diagram of an example computing system in which some described embodiments can be implemented.

DETAILED DESCRIPTION

Example 1—Overview

Figure 1:
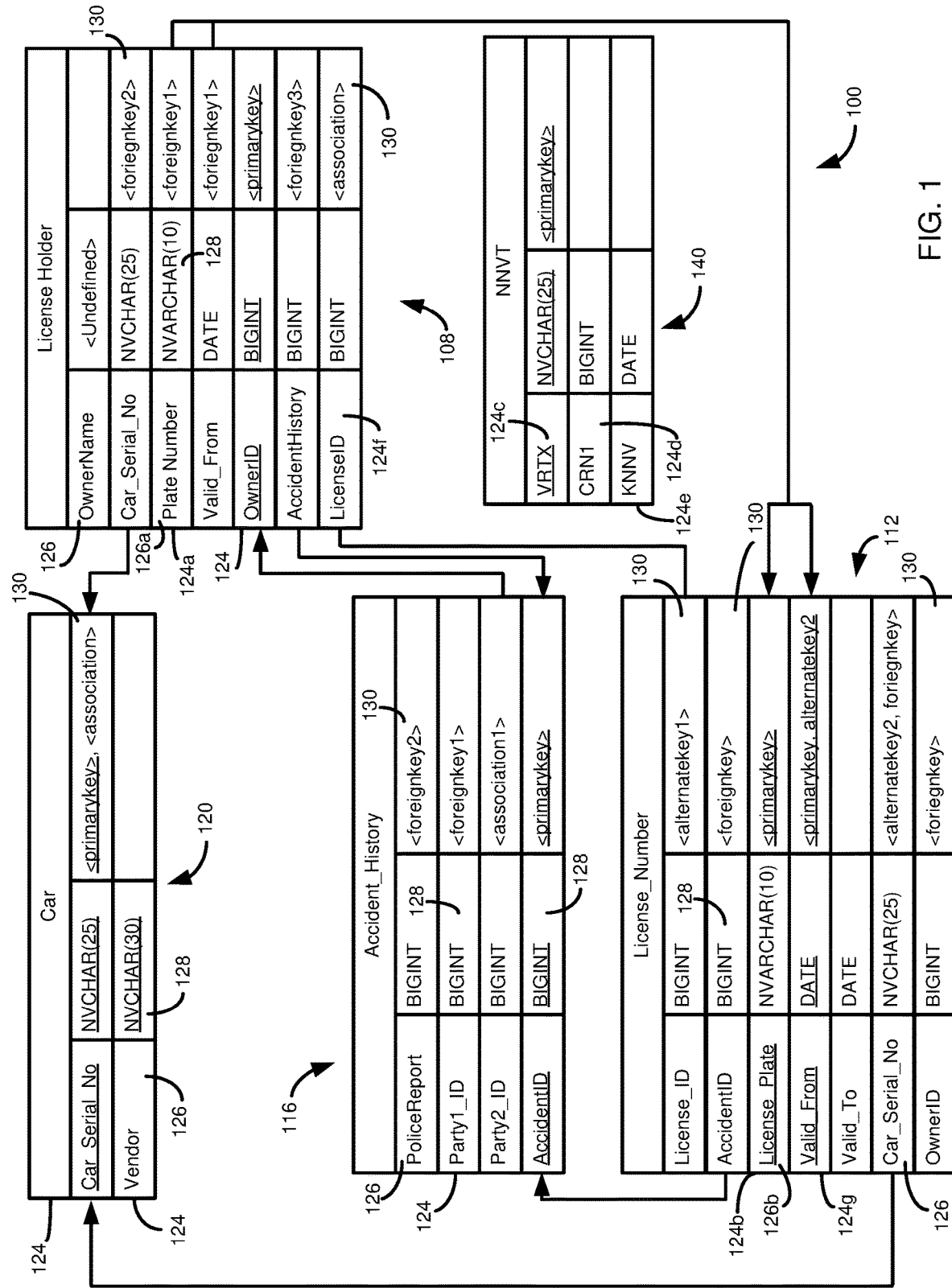
FIG. 1 is a diagram of a database schema showing technical relationships between at least a portion of database tables in the schema.

Software systems are increasingly diverse and complex. For example, many software applications use stored data, which may be stored in a database, such as a relational database. However, accessing data in a relational database can be cumbersome for non-technical users, and it may be beneficial to add semantics and functionality to the database data that can be used by a variety of applications or application processes. In addition, it may not be desirable for many users to have direct access to data at the level of the database.

Accordingly, a variety of software layers can exist "above" the database level. Objects in these layers can refer to objects in lower-level layers, as well as referring to other objects in a same layer. A given object can be related to many objects, including many objects at a same level or many objects at higher or lower levels. Understanding how a change to a definition of a particular object, or data stored in, or accessible using, a particular object can affect other objects, and their data can be exceedingly complex.

For example, a data model may be so complex that a given user may not understand all of the relationships. Moreover, as noted above, the user may not even be aware that other layers exist. Software implementing one or more layers may be able to track some relationships between objects, such as objects in a database, but may not be able to track other relationships, or at least such functionality may not be easily accessible to users or other computing processes. Accordingly, room for improvement exists.

Currently, it can be difficult to track impacts resulting from changes to object definitions or object data. As will be further described, "objects" as used herein include "data objects," which define a schema for storing or accessing data, where an object directly stores the data (such as a database table) or can be used to access the data but may not store (or at least persistently store) the data, such as a view of a virtual data model. To the extent a particular implementing technology, such as a relational database management system, may track particular object relationships, it may be possible to do some limited tracking using such relationships. However, more complex impact tracking typically requires custom solutions that involve specific objects having specific relationships. It can be complex and time consuming to develop such tracking systems in the first instance. Moreover, significant technical skill is often required, meaning that impact analysis is not something that is generally available to less technical users, and tracking may not be available in many situations where it could be especially useful.

Even if tracking is implemented, significant development efforts may be required if the tracking scenario changes, such as changes to various data models used by the tracking, or technical systems on which the tracking scenario relies. So, changes to data models or technical systems may "break" tracking functionality, and because of the complexity the tracking functionality may not be made available again for a significant period of time.

Generally, the present disclosure facilitates impact tracking or tracing using a model, where the model has "model objects" that represent objects ("data objects") that store data, or which can be used to access or process data. In some cases, "model objects" can represent relationships between such objects.

A repository in a computing system can comprise multiple objects or "artifacts" with the same or different types. As used herein, an "object" (or "data object") refers to a computing object that includes a definition of data (such as data members, which can be variables of various types) and one or more methods to be performed on the data. Examples of objects include instances of abstract data types (such as a "class"). Note that the operations on data need not, at least in some cases, be explicitly defined by a user. For example, a composite data type, such as a "struct," can be considered an "object" where the operations on data are handled by another programming layer (for example, using basic elements of the programming language or program libraries). Objects can have different "types" (in other words, having different definitions), and instances of the object are created/instantiated using a definition of the corresponding object type.

An "artifact" refers to elements, which may be code or non-code, which assist in developing or executing software, and can include "objects," and can include data types (including abstract data types) or other types of "objects," or instances thereof, that are created by end users or computing processes without being directly programmed by a user. As an example, a user may create a definition of a "view" in a virtual data model using a user interface or "high level" commands. The view may be considered an object, and an instance of the view can be created, but the user did not directly write the code that implements the view. An artifact can be, for example, an instance of a composite data type.

The remainder of the present disclosure proceeds with a discussion of disclosed technologies using the example of "object," but unless otherwise indicated the discussion applies analogously to "artifacts." More particularly, the discussion provides a specific example of objects used in database applications, such as database tables or views, entity types or views in a "virtual data model" that references the database tables or views (where, for example, the database tables or views store data, and the virtual data model objects can facilitate access to such data), and higher-level objects, such as "logical data objects" (as will be further described herein) or objects that are created to facilitate user/programmatic access to, and use/manipulation of, data from the database tables or views that is accessed using the virtual data model. As an example, a logical data object can be a "BusinessObject" as implemented in technologies available from SAP SE, of Walldorf, Germany, while examples of "virtual data models" include ABAP and CDS views, both available from SAP SE. Examples of database tables and views include those implemented in the HANA database system of SAP SE.

The objects can be interrelated by inherent relationships, or can be interrelated by defined relational rules ("defined relationships"). As described above, objects have data, including data that is specific to an "instance" of the object. For example, an object can be a database table that has a plurality of columns (where a column can also be implemented as an object) and a plurality of rows (where again a row can be an object, where the table object includes both row objects and column objects). Certain data members represent particular types of values that are common between object instances, such as when an object represents something in "real world" (like an "employee" or a "product"), but where the values differ between object instances. These types of data members can be referred to as "attributes" or "elements."

Different objects can be related by their attributes, or through other mechanisms. For example, two objects may include one or more attributes that are "common" and "operationally linked." For example, a first database table can have one or more attributes that uniquely identify a particular row of the first table (a "key," which may be a "primary key"), and a second table can include that same set of one or more attributes as a way of relating the first and second tables (where that set of one or more attributes in the second table can be referred to as a "foreign key"). This type of relationship is referred to herein as an "inherent relationship" because there is a "technical" property of the objects that allows them to be linked, whether the link is expressly specified in the objects or whether it is operationally determined when the objects are accessed (for example, when executing a JOIN between two tables, programmatic logic may check to see whether the tables have one or more columns in common that are specified as a join condition).

Objects can have a variety of types and relationships, and can exist in different systems, where there may not be a "technical" link that can be used to natively relate different objects together. While a computing system may be able to natively "follow" some types of relationships, such as primary key—foreign key relationships, other relationships may be such that logic is not available, or at least not easily available, to follow relationships even if they exist. For example, a two logical data objects, such as BusinessObjects of SAP SE of Walldorf, Germany, may be "related" as including the same CDS (core data services) view, but simply analyzing the view or the logical data objects may not identify the objects as "related." Data from one computing system, such as a financial computing system, may be impacted by data in another system, such as a supply chain management system, but these computing systems may be different and difficult to couple together outside of pre-defined processes (such as an ETL process).

The present disclosure provides techniques that assist in determining how a change to an object can affect other objects, including determining what objects or object elements might be affected by a change, or determining how the objects are changed. In doing so, the present disclosure uses models that include model objects, where a model object represents one of the data objects, and a model links model objects and the objects they represent.

While model objects can also be "objects" in the traditional computer science sense, the present disclosure uses the term "object" (which can also be referred to as a data object, a repository object, a represented object, or a modelled object) to represent the "base" objects that are used in data processing and for which changes may or may not occur based on changes to other objects. In contrast, model objects represent such objects. While a model object can be used to determine if/how the objects they model are changed, the model objects themselves are not changed by a change to data accessible through an object. On the other hand, a change to a definition of an object can affect model objects, as changing a definition of an object can influence what other objects it is related to, and which relationships are modeled using the model objects.

In some cases, model "objects" can be represented in rows of a table, such as a relational database table, where the columns form a "schema" for a model object and the rows correspond to instances of the model object. A given table can represent a model composed of model object instances, or a table can store information for multiple models, such as including a column that provides a model identifier.

The specification proceeds with a discussion of different types of objects, how such objects can be implemented, and how various objects can be related to one another, in Examples 2-9. Example 10 illustrates different objects and object layers that can be represented in models of the present disclosure. Example 11 illustrates an example set of objects that can be modelled using disclosed techniques, while Examples 12-15 describe disclosed models, modelling techniques, and computing systems that can be used in their implementation, including providing a model and model objects that represent the set of objects in Example 11.

Example 2—Example Database Schema with Technical Relationships

FIG. 1 is an example entity-relation (ER) type diagram illustrating a data schema 100 related to a driver's accident history. The schema 100 (which can be part of a larger schema, the other components not being shown in FIG. 1) can include a table 108 associated with a license holder (e.g., an individual having a driver's license), a table 112 associated with a license, a table 116 representing an accident history, and a table 120 representing cars (or other vehicles).

Each of the tables 108, 112, 116, 120 can include a plurality of fields 124. Each field 124 can be associated with technical information, such as a name or identifier 126, a datatype 128, and a flag or status indicator 130 indicating whether the field represents a primary key, indicates a foreign key relationship with another table, or indicates another type of technical relationship with another table. The flag 130 represents technical information that can be used to link two or more tables, including linking particular fields 124 of particular tables. The status indicator 130 can be an indicator of an inherent relationship between two tables (or, more generally, between two database objects).

Schema information with technical information is typically maintained in a database layer, such as a software layer associated with where table values are maintained (e.g., in a RDBMS), and typically includes identifiers for the tables 108, 112, 116, 120, and the name 126 and datatype 128 of their associated fields 124. Schema information may also include at least some of the information conveyable using the flag 130, such as whether a field is associated with a primary key, or indicating a foreign key relationship. However, other relationships, including more informal associations, may not be included in a schema associated with a database layer (e.g., the INFORMATION_SCHEMA of PostgreSQL).

Database layer schema information typically does not include semantic information. Although, in the particular example shown, the fields 124 have names 126 that at least suggest the meaning of their content, in many database schemas, the fields do not have names which convey the meaning of a field. In any event, fields 124 having the same semantic information, or having at least some semantic information in common, may have different technical information. For example, field 124a has the name 126a of "Plate Number," which may or may not have the same semantic meaning as field 124b with the name 126b of "License Plate." A search of the database for information regarding "License Plate" may retrieve records associated with name 126b, but may miss records with the name 126a. The converse can also be true, where a search for "License Plate" may retrieve records from two tables, even though the term has different semantic meanings in the two fields. That is, two fields may have the same name by coincidence (or through a design that simply is not concerned about such redundancies).

Apart from missing some records that have overlapping or identical semantics, or retrieving records with different semantics, there is the question of how potentially relevant tables should be located. As discussed above, especially for large, complex database systems, it can be difficult for any particular user to be fully aware of the entire database schema. Technical users may have a better understanding of the technical nature of the database, but may lack insights into the meaning, or semantic information, of the data, in order to retrieve appropriate data from the database. Similarly, non-technical users may understand what information they want, but not how to get it, including not understanding the database schema or query languages. Although it may be possible to find some semantically related tables through technical relationships, such as foreign key relationships, such a search may fail to find some related tables.

FIG. 1 includes a table 140. The table 140 does not have a technical relationship with any other table in the portion of the schema 100 shown in FIG. 1. In addition, the fields 124c-124e have names that do not readily convey their meaning or purpose, or indicate whether they might have the same meaning or purpose as other fields 124 in the schema 100. For instance, field 124c may have the same semantic meaning as field 124a, field 124d may have the same meaning as field 124f, and field 124e may have the same meaning as field 124g. Thus, a search for field 124d may miss results in table 140, as it may not be known that table 140 should be searched, and, based on the different field names 126, the results in table 140 would be missed even if table 140 were included in the search.

Example 3—Example Table Elements Including Semantic Identifiers

Figure 2:
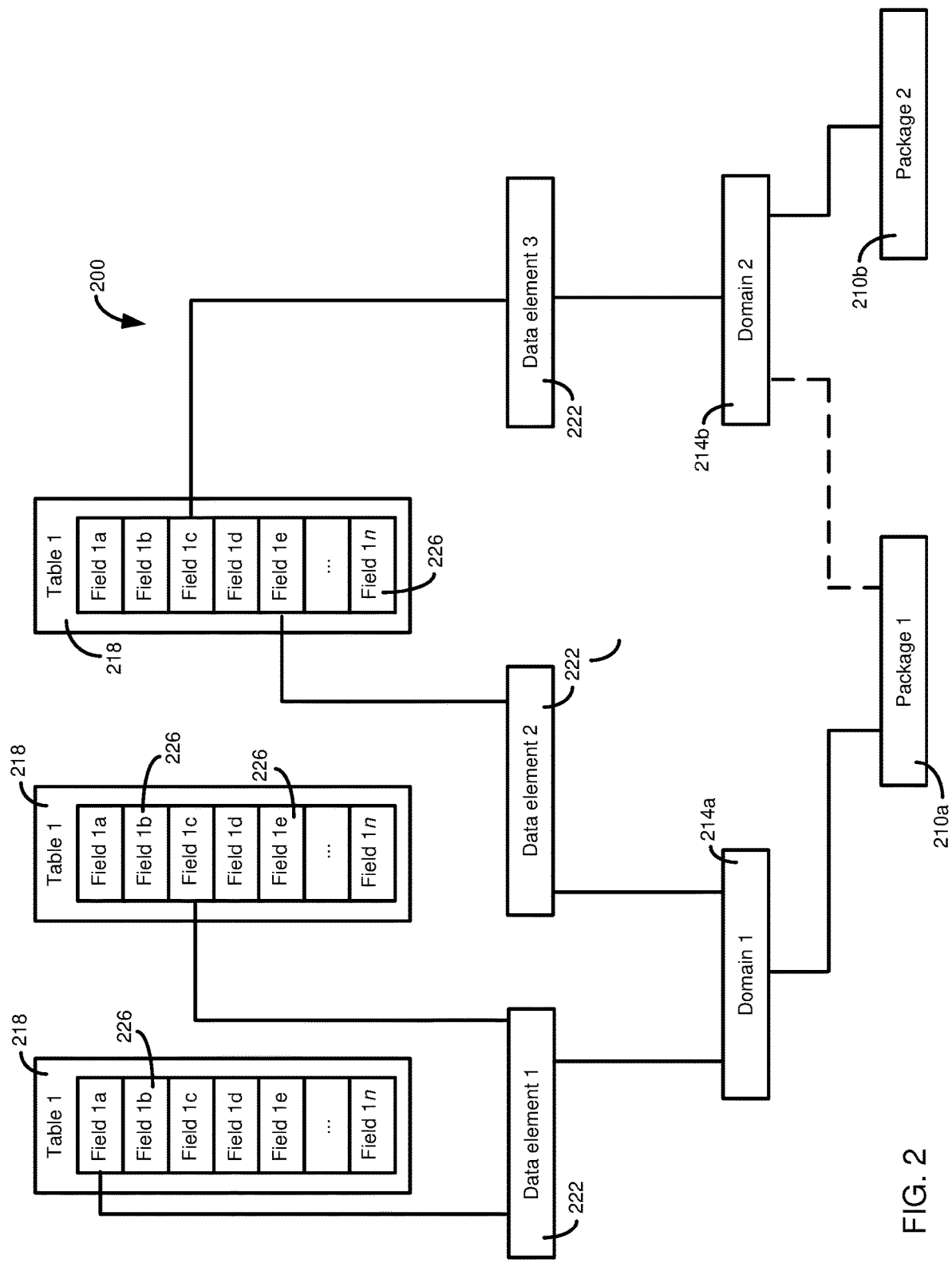
FIG. 2 is a schematic diagram illustrating relationships between table elements that can be included in a data dictionary, or otherwise used to define database tables.

FIG. 2 is a diagram illustrating elements of a database schema 200 and how they can be interrelated. In at least some cases, the database schema 200 can be maintained other than at the database layer of a database system. That is, for example, the database schema 200 can be independent of the underlying database, including a schema used for the underlying database. Typically, the database schema 200 is mapped to a schema of the database layer (e.g., schema 100 of FIG. 1), such that records, or portions thereof (e.g., particular values of particular fields) can be retrieved through the database schema 200.

The database schema 200 can include one or more packages 210. A package 210 can represent an organizational component used to categorize or classify other elements of the schema 200. For example, the package 210 can be replicated or deployed to various database systems. The package 210 can also be used to enforce security restrictions, such as by restricting access of particular users or particular applications to particular schema elements.

A package 210 can be associated with one or more domains 214 (i.e., a particular type of semantic identifier or semantic information). In turn, a domain 214 can be associated with one or more packages 210. For instance, domain 1, 214a, is associated only with package 210a, while domain 2, 214b, is associated with package 210a and package 210b. In at least some cases, a domain 214 can specify which packages 210 may use the domain. For instance, it may be that a domain 214 associated with materials used in a manufacturing process can be used by a process-control application, but not by a human resources application. Domains can be, or can identify, a type of inherent relationship. Note that, for the present disclosure, "inherent" relationships can be either technical or semantic, provided they are definitional aspects of an object.

In at least some implementations, although multiple packages 210 can access a domain 214 (and database objects that incorporate the domain), a domain (and optionally other database objects, such as tables 218, data elements 222, and fields 226, described in more detail below) is primarily assigned to one package. Assigning a domain 214, and other database objects, to a unique package can help create logical (or semantic) relationships between database objects. In FIG. 2, an assignment of a domain 214 to a package 210 is shown as a solid line, while an access permission is shown as a dashed line. So, domain 214a is assigned to package 210a, and domain 214b is assigned to package 210b. Package 210a can access domain 214b, but package 210b cannot access domain 214a.

Note that at least certain database objects, such as tables 218, can include database objects that are associated with multiple packages. For example, a table 218, Table 1, may be assigned to package A, and have fields that are assigned to package A, package B, and package C. The use of fields assigned to packages A, B, and C in Table 1 creates a semantic relationship between package A and packages B and C, which semantic relationship can be further explained if the fields are associated with particular domains 214 (that is, the domains can provide further semantic context for database objects that are associated with an object of another package, rather than being assigned to a common package).

As will be explained in more detail, a domain 214 can represent the most granular unit from which database tables 218 or other schema elements or objects can be constructed. For instance, a domain 214 may at least be associated with a datatype. Each domain 214 is associated with a unique name or identifier, and is typically associated with a description, such as a human readable textual description (or an identifier than can be correlated with a human readable textual description) providing the semantic meaning of the domain. For instance, one domain 214 can be an integer value representing a phone number, while another domain can be an integer value representing a part number, while yet another integer domain may represent a social security number. The domain 214 thus can help provide common and consistent use (e.g., semantic meaning) across the schema 200. That is, for example, whenever a domain representing a social security number is used, the corresponding fields can be recognized as having this meaning even if the fields or data elements have different identifiers or other characteristics for different tables.

The schema 200 can include one or more data elements 222. Each data element 222 is typically associated with a single domain 214. However, multiple data elements 222 can be associated with a particular domain 214. Although not shown, multiple elements of a table 218 can be associated with the same data element 222, or can be associated with different data elements having the same domain 214. Data elements 222 can serve, among other things, to allow a domain 214 to be customized for a particular table 218. Thus, the data elements 222 can provide additional semantic information for an element of a table 218.

Tables 218 include one or more fields 226, at least a portion of which are mapped to data elements 222. The fields 226 can be mapped to a schema of a database layer, or the tables 218 can be mapped to a database layer in another manner. In any case, in some embodiments, the fields 226 are mapped to a database layer in some manner. Or, a database schema can include semantic information equivalent to elements of the schema 200, including the domains 214.

In some embodiments, one or more of the fields 226 are not mapped to a domain 214. For example, the fields 226 can be associated with primitive data components (e.g., primitive datatypes, such as integers, strings, Boolean values, character arrays, etc.), where the primitive data components do not include semantic information. Or, a database system can include one or more tables 218 that do not include any fields 226 that are associated with a domain 214. However, the disclosed technologies can include a schema 200 (which can be separate from, or incorporated into, a database schema) that includes a plurality of tables 218 having at least one field 226 that is associated with a domain 214, directly or through a data element 222.

Example 4—Example Data Dictionary Components

Schema information, such as information associated with the schema 200 of FIG. 2, can be stored in a repository, such as a data dictionary. As discussed, in at least some cases the data dictionary is independent of, but mapped to, an underlying relational database. Such independence can allow the same database schema 200 to be mapped to different underlying databases (e.g., databases using software from different vendors, or different software versions or products from the same vendor). The data dictionary can be persisted, such as being maintained in a stored table, and can be maintained in memory, either in whole or part. An in-memory version of a data dictionary can be referred to as a dictionary buffer.

FIG. 3 illustrates a database environment 300 having a data dictionary 304 that can access, such as through a mapping, a database layer 308. The database layer 308 can include a schema 312 (e.g., an INFORMATION_SCHEMA as in PostgreSQL) and data 316, such as data associated with tables 318. The schema 312 includes various technical data items/components 322, which can be associated with a field 320, such as a field name 322a (which may or may not correspond to a readily human-understandable description of the purpose of the field, or otherwise explicitly describe the semantic meaning of values for that field), a field data type 322b (e.g., integer, varchar, string, Boolean), a length 322c (e.g., the size of a number, the length of a string, etc., allowed for values in the field), a number of decimal places 322d (optionally, for suitable datatypes, such as, for a float with length 6, specifying whether the values represent XX.XXXX or XXX.XXX), a position 322e (e.g., a position in the table where the field should be displayed, such as being the first displayed field, the second displayed field, etc.), optionally, a default value 322f (e.g., "NULL," "0," or some other value), a NULL flag 322g indicating whether NULL values are allowed for the field, a primary key flag 322h indicating whether the field is, or is used in, a primary key for the table, and a foreign key element 322i, which can indicate whether the field 320 is associated with a primary key of another table, and, optionally, an identifier of the table/field referenced by the foreign key element. A particular schema 312 can include more, fewer, or different technical data items 322 than shown in FIG. 3.

The tables 318 are associated with one or more values 326. The values 326 are typically associated with a field 320 defined using one or more of the technical data elements 322. That is, each row 328 typically represents a unique tuple or record, and each column 330 is typically associated with a definition of a particular field 320. A table 318 typically is defined as a collection of the fields 320, and is given a unique identifier.

The data dictionary 304 includes one or more packages 334, one or more domains 338, one or more data elements 342, and one or more tables 346, which can at least generally correspond to the similarly titled components 210, 214, 222, 218, respectively, of FIG. 2. As explained in the discussion of FIG. 2, a package 334 includes one or more (typically a plurality) of domains 338. Each domain 338 is defined by a plurality of domain elements 340. The domain elements 340 can include one or more names 340a. The names 340a serve to identify, in some cases uniquely, a particular domain 338. A domain 338 includes at least one unique name 340a, and may include one or more names that may or may not be unique. Names which may or may not be unique can include versions of a name, or a description, of the domain 338 at various lengths or levels of detail. For instance, names 340a can include text that can be used as a label for the domain 338, and can include short, medium, and long versions, as well as text that can be specified as a heading. Or, the names 340a can include a primary name or identifier and a short description or field label that provides human understandable semantics for the domain 338.

In at least some cases, the data dictionary 304 can store at least a portion of the names 340a in multiple languages, such as having domain labels available for multiple languages. In embodiments of the disclosed technologies, when domain information is used for identifying relationships between tables or other database elements or objects, including searching for particular values, information, such as names 340a, in multiple languages can be searched. For instance, if "customer" is specified, the German and French portion of the names 340a can be searched as well as an English version.

The domain elements 340 can also include information that is at least similar to information that can be included in the schema 312. For example, the domain elements 340 can include a data type 340b, a length 340c, and a number of decimal places 340d associated with relevant data types, which can correspond to the technical data elements 322b, 322c, 322d, respectively. The domain elements 340 can include conversion information 340e. The conversion information 340e can be used to convert (or interconvert) values entered for the domain 338 (including, optionally, as modified by a data element 342). For instance, conversion information 340 can specify that a number having the form XXXXXXXXX should be converted to XXX-XX-XXXX, or that a number should have decimals or comma separating various groups of numbers (e.g., formatting 1234567 as 1,234,567.00). In some cases, field conversion information for multiple domains 338 can be stored in a repository, such as a field catalog.

The domain elements 340 can include one or more value restrictions 340f. A value restriction 340f can specify, for example, that negative values are or are not allowed, or particular ranges or threshold of values that are acceptable for a domain 338. In some cases, an error message or similar indication can be provided as a value is attempted to be used with a domain 338 that does not comply with a value restriction 340f. A domain element 340g can specify one or more packages 334 that are allowed to use the domain 338.

A domain element 340h can specify metadata that records creation or modification events associated with a domain element 338. For instance, the domain element 340h can record the identity of a user or application that last modified the domain element 340h, and a time that the modification occurred. In some cases, the domain element 340h stores a larger history, including a complete history, of creation and modification of a domain 338.

A domain element 340i can specify an original language associated with a domain 338, including the names 340a. The domain element 340i can be useful, for example, when it is to be determined whether the names 340a should be converted to another language, or how such conversion should be accomplished.

Data elements 342 can include data element fields 344, at least some of which can be at least generally similar to domain elements 340. For example, a data element field 344a can correspond to at least a portion of the name domain element 340a, such as being (or including) a unique identifier of a particular data element 342. The field label information described with respect to the name domain element 340a is shown as separated into a short description label 344b, a medium description label 344c, a long description label 344d, and a header description 344e. As described for the name domain element 340a, the labels and header 344b-344e can be maintained in one language or in multiple languages.

A data element field 344f can specify a domain 338 that is used with the data element 342, thus incorporating the features of the domain elements 340 into the data element. Data element field 344g can represent a default value for the data element 342, and can be at least analogous to the default value 322f of the schema 312. A created/modified data element field 344h can be at least generally similar to the domain element 340h.

Tables 346 can include one or more table elements 348. At least a portion of the table elements 348 can be at least similar to domain elements 340, such as table element 348a being at least generally similar to domain element 340a, or data element field 344a. A description table element 348b can be analogous to the description and header labels described in conjunction with the domain element 340a, or the labels and header data element fields 344b-344e. A table 346 can be associated with a type using table element 348c. Example table types include transparent tables, cluster tables, and pooled tables, such as used as in database products available from SAP SE of Walldorf, Germany.

Tables 346 can include one or more field table elements 348d. A field table element 348d can define a particular field of a particular database table. Each field table element 348d can include an identifier 350a of a particular data element 342 used for the field. Identifiers 350b-350d, can specify whether the field is, or is part of, a primary key for the table (identifier 350b), or has a relationship with one or more fields of another database table, such as being a foreign key (identifier 350c) or an association (identifier 350d).

A created/modified table element 348e can be at least generally similar to the domain element 340h.

Example 5—Example Metadata Model

FIG. 4 illustrates a definition of a metadata model 400. The metadata model 400, in particular, represents a view, such as a Core Data Services view of SAP SE, of Walldorf, Germany. The metadata model 400 can include a variety of different components, at least some of which can be considered to be metadata models. That is, the metadata model 400 can be a model that is based at least in part on multiple sub-models. The sub-models can specify particular aspects of the overall metadata model 400.

The metadata model 400 can optionally include one or more annotations 404. An annotation can be a metadata component that can be added to a metadata model. For example, a provider may supply a base model, and individual users or customers may wish to add metadata that is specific to their operating environment and use cases. The ability to add annotations can thus enhance usability by allowing for custom metadata elements, without impacting other users of a base metadata model. Annotations can be specified for different software layers or frameworks.

In the example shown, annotations 404 can be indicated as annotations using particular syntax elements, such as by preceding an annotation with the "@" symbol. In at least some cases, annotations 404 can also be indicated by placing them in the appropriate portion of a metadata model, such as in a header section or another section designated for annotations. In some cases, annotations 404 can reference other metadata models, such as a metadata model of a data source, or can reference a data source that is associated with a metadata model. In either event, such an association 404 can create a dependency between the metadata model 400 and the other metadata model/data source.

The metadata model 400 can include instructions 408, in this case a SQL statement 410, defining a core metadata model/object having an identifier 412 (which can be used, for example to later access or activate, such as to instantiate, the metadata model). In particular, the instructions 408 shown define a view. The annotations 404 further specify properties of the view, as do other portions of the metadata model 400 that will be further described.

The instructions 408 can specify one or more data sources 416. Data sources 416 can define data to which at least a portion of the metadata of the metadata model 400 will apply, and can also supply additional metadata for the metadata model 400. Note that the metadata model 400 can be, in at least a sense, dependent on referenced data sources 416. For example, if the metadata model 400 relies on particular expected data or metadata of a data source 416, the metadata model may be unusable, have performance issues, or provide incorrect results if the referenced data sources do not include expected data or metadata, or are otherwise inconsistent with how the data source is used in the metadata model. As shown, the data sources 416 includes two tables, "vbak" and "vbkd." These tables will typically include metadata features such as one or more fields, where each field is associated with a data type, designations of a primary key, and optionally associations with other database components, such as association or foreign key relationships with other database tables.

The metadata model 400 can optionally include specifications of one or more associations 420. An association 420 can define a relationship to another entity. An association 420 can be processed during the use of the metadata model 400, such as being converted to a SQL expression such as a JOIN. Unlike other conditions or elements that are included in the metadata model 400, associations can define a relationship that can at least in some cases be optional, such as being selectively activated depending upon how the metadata model is accessed. For example, an association 420 can be converted to a JOIN condition that uses a table provided in a SELECT statement that references the metadata model 400.

The metadata model 400 can include one or more components 422 that specify how data retrieved using the metadata model should be processed, including to generate values that are associated with other metadata elements of the metadata model. Processing can include calculating values, such as using a formula specified in, or referenced by, the metadata model 400. In particular, a processing component 422 can specify that a particular field value should be treated as an element 424. Thus, the metadata model 400 can include dependencies on how elements are defined, and the metadata model 400 may not be accurate, or useable, if the element definition does not match how it is used, and intended to be used, in the metadata model 400.

The metadata model 400 can optionally include additional components, such as one or more conditions 428, or other operations, such as aggregations, unions, etc., including such operations that are typically supported by a database query language. In addition to instantiated artifacts, information about the artifacts can be stored in a persistency model, such as one or more database tables. An example persistency model that can be used with artifacts is disclosed in U.S. patent application Ser. No. 16/387,983, filed Apr. 18, 2019, and incorporated by reference herein.

Example 6—Example Metadata Model, Including Relationships with Other Metadata Models FIG. 5 illustrates how metadata models may have dependencies on other metadata models. In particular, FIG. 5 shows a view metadata model 504, which can be the metadata model 400 of FIG. 4. FIG. 5 also illustrates a metadata model 508 for an access control object (such as a DCLS, or data control language source), a metadata model 512 for a metadata extension object (such as a DDLX, or metadata extension), and a metadata model 516 for an extension element object (such as a DDLS, or data definition language source).

The access control object metadata model 508 can be used for restricting access to data that can be retrieved using the view metadata model 504. For example, the view metadata model 504 and the access control object metadata model 508 can be processed together when the view metadata model 504 is activated, such as to generate SQL commands that retrieve data for the view metadata model, but which are filtered or restricted based on the access control object metadata model. As the access control object metadata model 508 references the view metadata model 504, the access control object metadata model depends on the view existing, and on the view containing elements specified in the access control object metadata model. For example, the access control object metadata model references the "SalesOrderType" element of the view "I_SampleSalesOrder" and the authorization object "V_VBAK_AAT" with its authorization field "AUART." Thus, the first element would be undefined or unusable if the corresponding element did not exist in the view metadata model 504.

Figure 6:
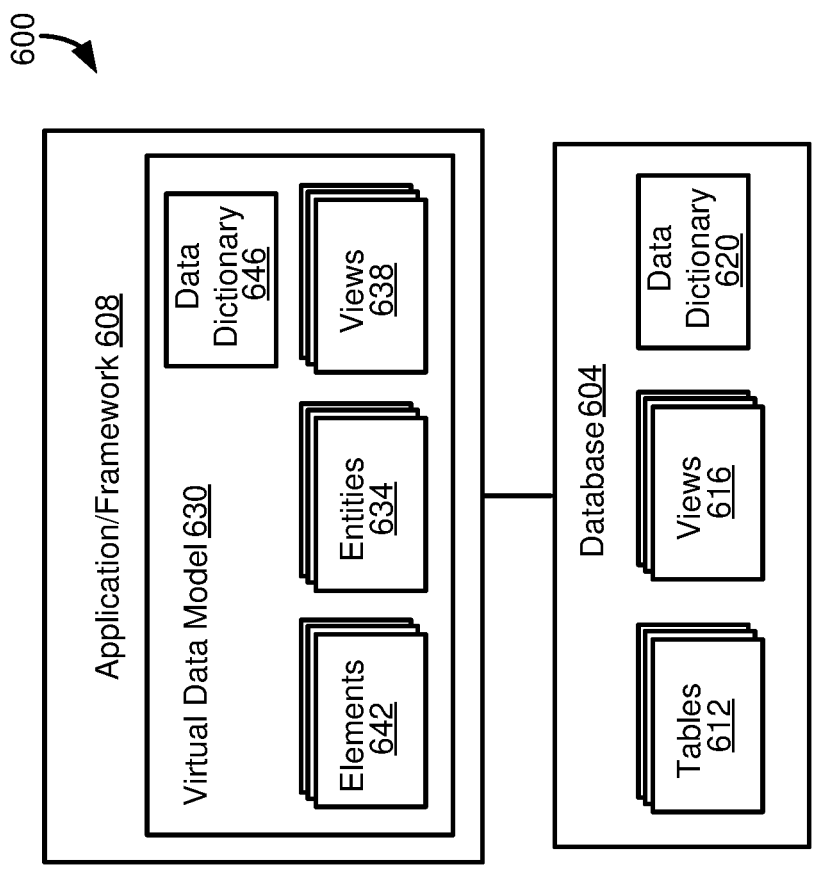
FIG. 6 is a diagram of a computing environment illustrating how a virtual data model can interact with a database system.

Example 7—Example Computing Environment Having Virtual Data Model Interacting with Database System FIG. 6 illustrates an example computing environment 600 in which disclosed technologies can be implemented. At a high level, the computing environment 600 includes a database system 604 that can communicate with an application or framework layer 608. The database system 604 includes data that can be used by the application/framework layer 608, or applications that communicates with the application/framework layer. The data can be stored in one or more tables 612 of the database 608. The data can be referenced by one or more views 616, which can be view definitions or materialized views (which can then also correspond to tables 612). A data dictionary 620 can store information regarding the tables 612 and the views 616.

The application/framework layer 608 includes a virtual data model 630. The virtual data model 630 can include entities 634 and views 638, which can at least generally correspond to the tables 612 and the views 616 of the database 608. However, as has been described, as compared with the tables 612 and views 616, artifacts in the virtual data model 630 are typically associated with additional information, such as semantic information or information that can be used to manipulate data in one or more artifacts of the database 608 that corresponds to a given artifact in the virtual data model. The virtual data model 630 can include information regarding elements 642, which can correspond to attributes or fields used in the entities 634 and views 638. At least some of the elements 642 can correspond to fields used in the database 604, but are enriched with additional information. Information regarding the entities 634, views 638, and elements 642 can be stored in a data dictionary 646 of the virtual data model 630.

Generally, as used in the present disclosure, a data artifact refers to an artifact in the virtual data model 630 that is intended for direct use by a user or application. A data artifact can include data elements, including those that refer to data stored in the database 604. However, a data artifact can also include metadata elements, which can describe data elements, or how the data artifact can be used or how it may be processed. Data elements and metadata elements can be collectively referred to as components of an artifact.

Example 8—Example Logical Data Object Schema

In any of the Examples described herein, a logical data object be a specific example of an object in an object-oriented programming approach. However, unless the context specifically indicates otherwise, aspects of the present disclosure described with respect to logical data objects can be applied to other types of objects, or other types of data collections. For example, a database table, or a group of related tables, can have fields that are analogous to data members of an object. Functions that correspond to member functions of an object can be defined to perform operations on the tables.

A logical data object can contain a definition of a hierarchical data structure and definitions of one or more operations that can be performed using portions of the hierarchical data structure. In some cases, a logical data object may be referred to as a "business object" and can take any number of forms including business intelligence or performance management components such as those implemented in software technologies of SAP BusinessObjects, ORACLE Hyperion, IBM Cognos, and others. However, the use of logical data objects in computer applications is not limited to "business" scenarios. Logical data objects can be used to define a particular application and/or problem domain space. Aspects and artifacts of a given problem domain can be defined using the hierarchical data structure and various portions of these aspects and/or artifacts can be associated directly with definitions of relevant logical operations. A logical data object can be an artifact of a virtual data model, or can be constructed with reference to artifacts of a virtual data model. In turn, components of the virtual data model can be mapped to another data model, such as a physical data model of a relational database system.

Figure 7:
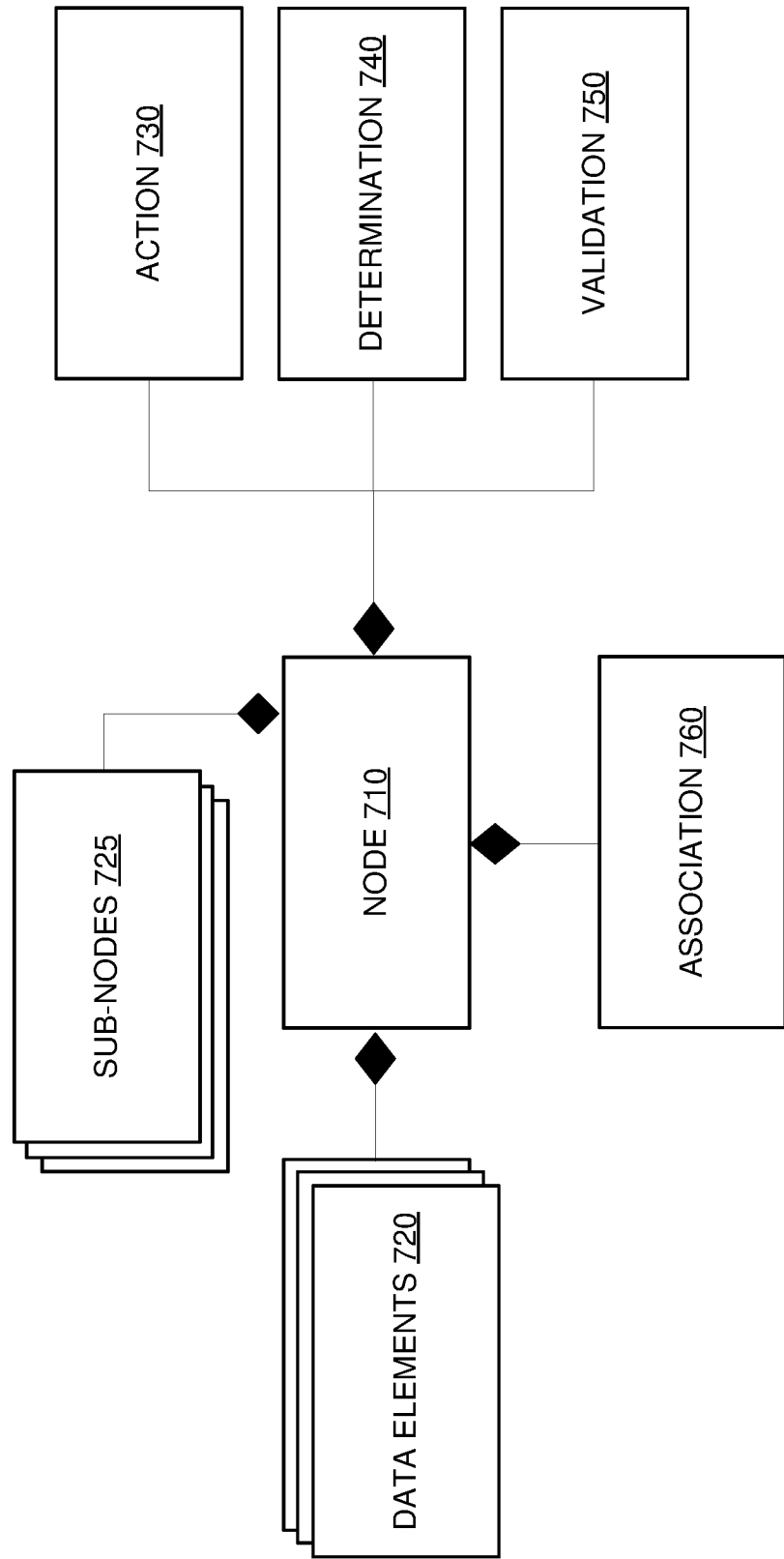
FIG. 7 is a block diagram depicting a schema for a logical data object.

FIG. 7 is a diagram of an example logical data object schema 700. A node 710 can contain one or more data elements 720 (i.e., variables, such as data members). A data element 720 can contain an identifier, such as a name, and an associated value. The identifier can, for example, be associated with a field of a particular database table. In at least some embodiments, the data element 720 can be associated with a data type that restricts and/or validates the type of data that can be stored as a value of the data element 720.

The node 710 can contain one or more child nodes 725 (also referred to as sub-nodes), which can themselves contain additional data elements 720 (and other node components, including sub-nodes 725). Combinations of sub-nodes 725 can be used to define a hierarchical data structure of multiple nodes 710. In at least some embodiments, the hierarchical data structure can contain a root node that does not have a parent-node and can be used as an entry point for traversing the hierarchical data structure.

Each node 710 in the logical data object can be associated with one or more actions 730. An action 730 can comprise a definition for a logical operation that can be performed using the node 710 with which it is associated. The action 730 can contain an identifier that can be used to invoke the action's logical operation. Each node 710 in the logical data object can be associated with one or more determinations 740. A determination 740 can contain a definition for a logical operation that can be automatically executed when a trigger condition is fulfilled. Example trigger conditions can include a modification of the associated node 710, a modification of the data element 720 of the associated node, the creation of a data element 720 of the associated node, etc. A logical operation defined by an action 730, or a determination 740, can comprise instructions to create, update, read, and/or delete one or more data elements 720 and/or one or more sub-nodes 725. Actions 730 or determinations 740 can be set to trigger, in some cases, upon the occurrence of a particular date (e.g., a particular date or a particular time on a particular date).

Each node 710 in the logical data object schema 700 can be associated with one or more validations 750. A validation 750 can contain a definition of one or more data integrity rules and/or checks. The one or more data integrity rules and/or checks can be performed when the associated node 710, and/or one or more data elements 720 of the associated node, are created, modified, and/or deleted. Any such operation that does not satisfy the one or more data integrity rules and/or checks can be rejected.

Each node 710 in the logical data object schema 700 can be associated with one or more nodes from one or more other logical data objects (having the same schema or a different schema) by one or more associations 760. An association 760 can contain an identifier for a node in another logical data object that is associated with the node 710. Associations 760 can be used to define relationships among nodes in various logical data objects. The association 760, in at least some embodiments, contains an association type indicator that identifies a type of association between the node 710 and the node in the other logical data object.

Although the action 730 is defined and associated with the node 710, when the action 730 is invoked, it targets an identified instance of the node 710 with which it is associated. Similarly, a determination 740 and/or validation 750 can be defined and associated with a node 710, but can target an instance of the associated node 710 when it/they is/are invoked. Multiple instances of a given logical data object can be created and accessed independently of one another. Actions 730, determinations 740, or validations 750 may correspond to member functions of a data object, such as implemented in a C++ class.

Although the instances of the logical data object share a common schema 700, the data values stored in their respective node instances and data element instances can differ, as can the logical data object instances that are associated by the associations 760. Additionally, or alternatively, an instance of an association 760 can identify a particular instance of an associated node in another logical data object instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Various actions may be performed using logical data objects including create, update, delete, read, and query operations. If the requested operation is a read operation, the data payload may contain a unique identifier associated with a logical data object instance to be retrieved. Processing a read operation request can comprise searching for an instance of the logical data object that is associated with the provided unique identifier in a data store, and retrieving all or part of a matching logical data object instance's data from the data store. If the requested operation is an update operation, the data payload may contain one or more values to be assigned to data element instances of an existing logical data object instance. The data payload may also contain a unique identifier associated with the logical data object instance to be updated. Processing an update operation request can comprise searching for a logical data object instance in a data store associated with the provided unique identifier and updating the matching logical data object instance with the provided data values.

Example 9—Example Relationships Database Schemas

Figure 8:
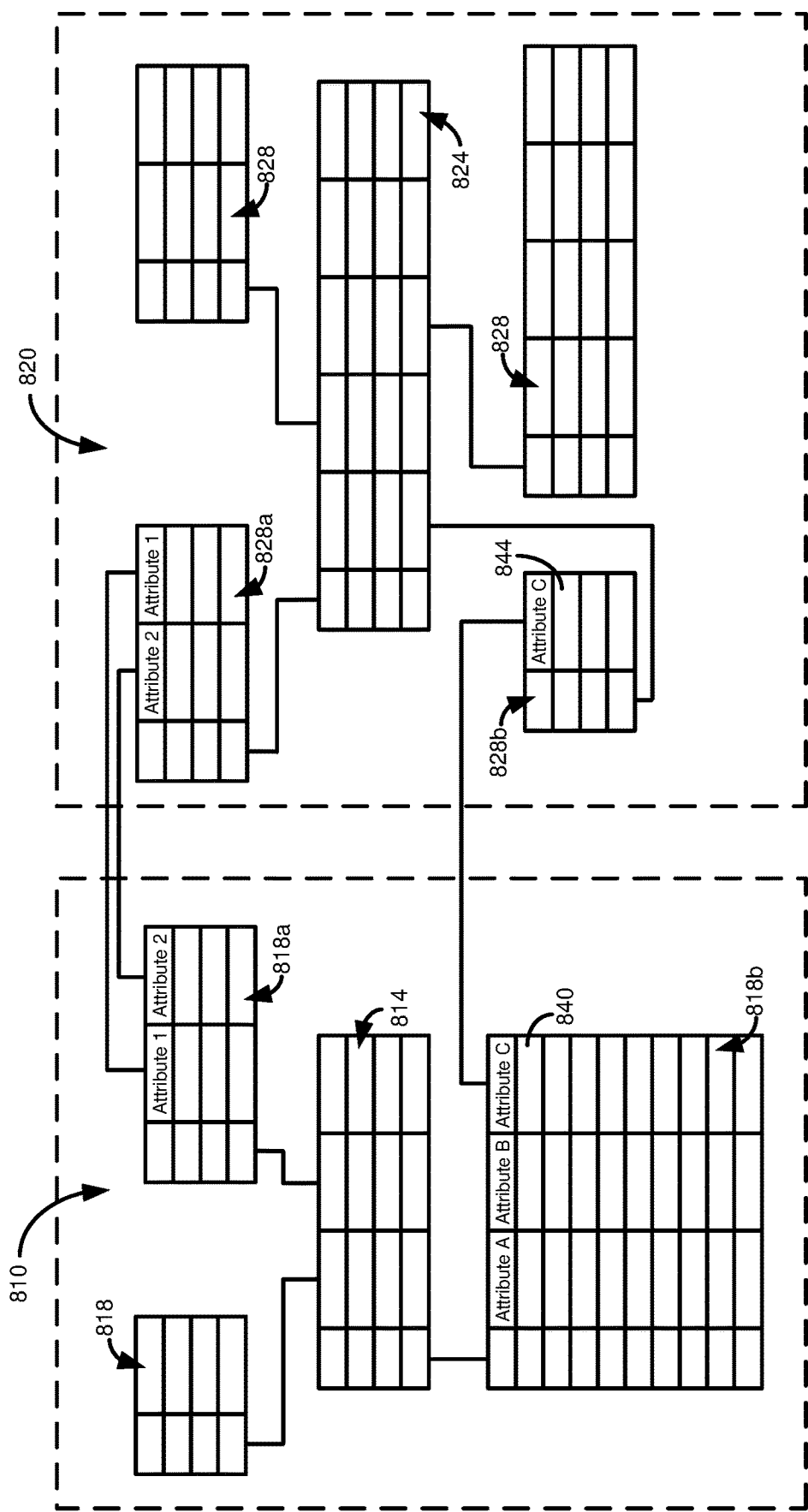
FIG. 8 is a diagram illustrating how different models or schemas can be related.

FIG. 8 schematically depicts two star schemas 810, 820. Star schema 810 includes a central fact table 114 and three dimension tables 818. Star schema 820 includes a central fact table 824 and four dimension tables 828.

In order to obtain data from multiple star schemas, a dimension table that is common to both fact tables is used to bridge the two schemas. In some cases, such bridging can occur if one dimension table is a subset of the other dimension table (e.g., one table contains all the attributes of the other, plus one or more additional attributes). In further cases, bridging can occur as long as at least one attribute is shared, or conformed, between the two star schemas.

For example, in FIG. 8, dimension table 818a is identical to dimension table 828a (other than, potentially, a record ID or other means of identifying tuples that does not convey substantive information). Or, rather than having duplicate tables, dimension table 818a and dimension table 828a can be the same table, but represented as members of multiple star schemas. Each attribute in the dimension tables 818a, 828a can serve as a pathway between facts in fact table 814 and facts in fact table 824. However, each of these pathways is different, in that different attributes are linked together. It can be important which attributes are used to link dimension tables 818a and 828a. For example, operations (e.g., specified by a SQL statement) to implement the pathways may be different. Additionally, some of the pathways may use indexed attributes, while others do not, which can affect the execution speed of a particular pathway.

In the example scenario of FIG. 8, an alternate way of obtaining facts from fact tables 814 and 824 is through the use of attribute 840 of dimension table 818b and attribute 844 of dimension table 828b. However, as shown in FIG. 8, table 818b includes a larger number of tuples than table 818a, which can result in a path involving table 818b having a longer execution time, and requiring more computing resources, than a path involving table 818a.

Figure 9:
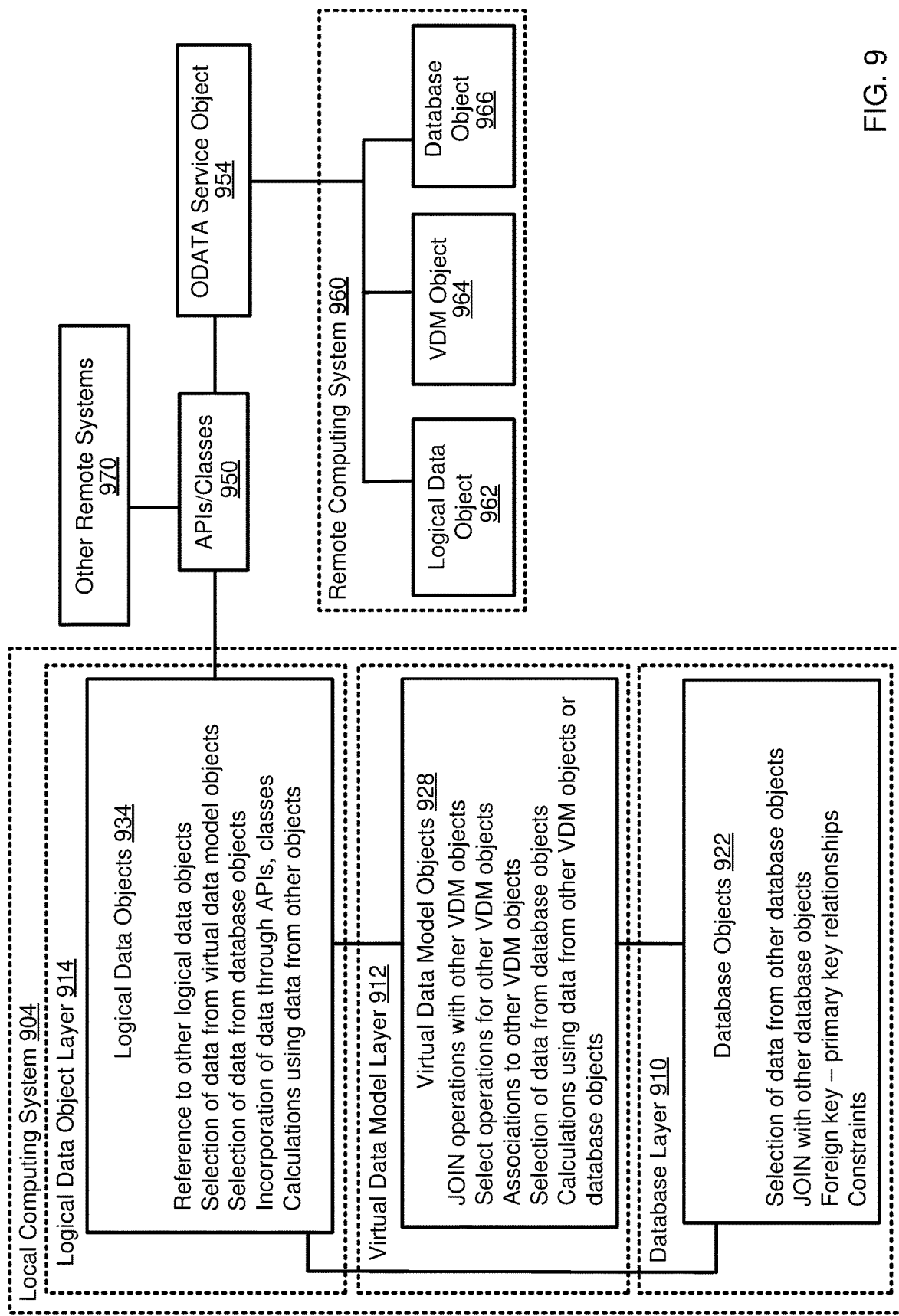
FIG. 9 is a diagram illustrating how objects of different software layers, and different computing systems, can be related, including providing example relationship types.

Example 10—Example Software Layers and Computing System Objects, Including Relationships Therebetween FIG. 9 is a diagram illustrating the relationship between different objects, where the relationships between the objects can be relationships between the same type or between objects of different types. Objects can be hierarchically arranged, including with objects at a same software "layer," as well as objects in different layers. As noted in Example 1, as used herein an "object" refers to an object in a repository or otherwise used for data processing operations, and which are modelled or represented by model objects that can facilitate interacting with objects, including determining changes to one or more objects based on changes to one or more other objects using the corresponding model objects that represent these objects.

In particular, FIG. 9 depicts objects in a database layer 910, a virtual data model layer 912, and a logical data object layer 914. The layers 910, 912, 914 are hierarchically arranged, in that that logical data objects are defined with respect to objects of the logical data object layer 914 and the "lower" layers 912, 910, while objects in the virtual data model layer 912 are defined with respect to objects in the virtual data model layer and the layer 910, and objects in the layer 910 are defined with respect to objects in the layer 910. Note that objects in a given layer 910, 912, 914 can, but need not, be defined with respect to other objects in the same layer. Also note that, at least given the nature of the particular layers in FIG. 9, lower-level layers are not defined with respect to upper layers.

Examples of the different layers 910, 912, 914, including the types of objects in a given layer and how objects in a layer can reference other objects in the layer or objects in lower-level layers, are discussed in Examples 2-9. FIG. 9 presents this information again in a format to help facilitate further discussion of the disclosed techniques.

Starting at the database layer 910, the database layer includes database objects 922. The database objects 922 can be tables that do not reference other tables, or can be tables that have a relationship to another table, such as through a foreign key-primary key relationship or another type of constraint. Another type of database object 922 is a view, where a view can include a selection of data from one or more views or tables.

At this point, it is worth noting again that "relationships" between objects, whether between objects of the same layer or objects in different layers, can be of different types. One type of relationship is an "inherent," or "technical" relationship. An inherent relationship is a relationship established by a definitional property of one or both of the objects in the relationship. A database view is typically established by operations expressed in a query language, including a SELECT statement (including such statements that include JOIN operations, or UNION operations), and so that is one type of inherent relationship. A primary key-foreign key relationship between two database tables is another example of an inherent relationship.

Also note that these relationships can have further "subtypes," or at least different consequences. That is, the "view" example results in incorporation of elements (both definitional elements, such as attributes, as well as data associated with such definitional elements) from one object into another object, while the "primary key-foreign key" relationship results in a link between the objects, without expressly incorporating data from one object into another. However, even when data is not incorporated into one object through a relationship to another object, a relationship can still constrain an object, such as where values entered into a table that has a foreign key relationship to another table may be constrained by the primary key values that are present in the other table.

Another general type or class of relationships is referred to as a "defined" relationship, which refers to a relationship that is established other than through definitional information. For instance, data in one system may be imported into another system, but where the definitional linkages are "lost" as part of the import process. Computer-implemented techniques can be used to define a relationship between these types of objects. For objects, generally, an object can have an inherent relationship with objects at the same or different layers, or can have a defined relationship with objects at the same or different layers.

As a further distinction between different relationships, some relationships may be "tracked" automatically by one or more of the layers, while other relationships may not be, even for inherent relationships. In general, a benefit of disclosed techniques is that they facilitate tracking and following relationships between objects when the objects are related by a relationship that is not tracked by a computing system, or at least is not tracked in a way that is easy for end users to access, or where the end user may not have access to tracking mechanisms. Further examples of tracked and untracked relationships, as well as defined relationships, will be discussed as the disclosure proceeds.

Turning to the virtual data model layer 912, objects 928 of the virtual data model layer can be generally similar to objects in the database layer, where a virtual data model object can correspond to a table or view (or other object) of the database layer 910. Typically, a virtual data model object 928 in the virtual data model layer 912 refers to at least one object 922 of the database layer 910. A virtual data model object 928 may add elements/attributes to those defined by reference to objects 922. A virtual data model object 928 may also incorporate elements from other virtual data model objects 928 (such as by SELECT operations, including with JOIN or UNION operators), or can be constrained by other virtual data model objects 928. Typically, higher-level layers allow for more "sophisticated" operations and enhanced semantics compared with lower-level objects. Accordingly virtual data model objects 928 can have more information "associations" that establish a link between two objects, and can define calculations that are based at least in part on values retrieved from another object (including another object 928), where the result of the calculation may be a new element/attribute for the virtual data model object 928.

Logical data objects 934 can have relationships that are similar to the virtual data model objects 928 or the database objects 922. For example, logical data objects 934 can be related to other logical data objects, including being constrained by information accessible through other logical data objects or using information in other logical data objects 934 for calculations. Logical data objects 934 can incorporate elements/data from objects 928 of the virtual data model layer 912, and in some case can incorporate elements/data from database objects 922. That is, in some cases an upper layer may be limited to referencing objects within the same layer or at the immediately preceding lower layer, while in other cases an upper layer can directly reference lower-level objects without "going through" an object of an intervening lower-level layer. The nature of the relationships between logical data objects 934 and virtual data model objects 928 can be similar to the nature of the relationships between virtual data model objects and database objects 922, such as through "SELECT"-type operations or use of information in virtual data model objects as constraints or in calculations.

Note that multiple higher-layer objects may reference a common lower-level object, even though the multiple higher-layer objects are not directly related to each other at the higher-layer. This can be an example of a relationship that is "inherent" but is not tracked, or at least not in a readily accessible way. A more detailed discussion is provided with respect to FIG. 10, but briefly consider a scenario where two logical data objects 934 reference a common virtual data model object 928, but where the two logical data objects 934 do not directly reference one another in their definition information at the logical data object layer 914.

The layers 910, 912, 914 are shown as being part of a local computing system 904. The local computing system 904 may in fact be implemented on multiple computing devices or systems, but where the devices or computing systems operate together in an integrate way. For example, there may be application software that operates the database layer 910 (such as HANA, from SAP SE of Walldorf, Germany), different application software that operates the virtual data model layer 912 (such as CDS views, as implemented in software available from SAP SE) and is configured to interact with the application that operates the database layer 910, and yet different application software that operates the logical data object layer 914 (such as BusinessObjects, as implemented in technologies available from SAP SE) and is configured to operate with the application that operates the virtual data model layer.

At least some layers of the local computing system 904 may be related to objects in other computing systems. The application software in the other computing systems may be the same as, or different than, application software running at the local computing system 904, but in any case, the data is "separated" in the sense that the data is in different schemas, where inherent relationships may not "cross" schema boundaries. As an aside, this issue can arise even within the local computing system 904. In any event, data from the local computing system 904 may be used in one or more remote computing systems, or data from one or more remote computing systems may be used in the local computing system. As an example, consider information from a transactional processing database system (OLTP database) that has data transferred periodically to an analysis and reporting (OLAP) system. Outside of defined ETL processes, there may not be any relationships between the data of the two systems, even though data from the OLTP database "affects" data in the OLAP system.

Techniques, whether the ETL processes (or computing methods that enable the ETL processes) or other computing methods, can be used to relate data between the local computing system 904 and one or more remote computing systems, and represent a type of "defined" relationship. Because the relationship is "defined," computing systems are not typically set up to track/analyze changes using defined relationships.

As more particular example, FIG. 9 illustrates the local computing system 904 as in communication with application program interfaces (APIs) or classes (where an API can be implemented as a class, other abstract data type, or using a computing paradigm that is analogous to classes/abstract data types) 950. The APIs/classes 950 serve to retrieve data for use by the local computing system 904, or to retrieve data from the local computing system for use by another computing system (referred to as a "remote" computing system, but where "remote" can mean "independent" or "separate" without necessarily implying that the two systems need to be separated in terms of physical proximity, although of course they can be).

The APIs/classes 950 are shown as in further communication with an ODATA service object 954. However, the ODATA service object 954 can be a particular example of an API/class 950. The APIs/classes 950 and ODATA service object 954 are shown as placing the local computing system 904 in communication with a remote computing system 960. Although shown as "outside" the local computing system 904 and the remote computing system 960, it should be appreciated that the APIs/classes 950 and the ODATA service object 954 can (and typically are) located in the local computing system or the remote computing system. Further, both the local computing system 904 and the remote computing system 960 can have APIs/classes/ODATA services or other techniques to facilitate a particular communication between the systems, such as computing methods at one system that send a request to another system and computing methods at the other computing system to respond to such requests.

The remote computing system 960 can have objects that incorporate data from the local computing system 904, or which provide data to the local computing system. The objects in the remote computing system 960 can be analogous to those in the local computing system 904, or can have different types. The nature and number of layers of objects in the remote computing system 960 can similarly mirror or vary from that of the local computing system 904, including a scenario where the local computing system 904 has the layers 910, 912, 914 as shown and the remote computing system 960 includes a single layer.

As shown, the remote computing system 960 includes logical data objects 962, virtual data model objects 964, and database objects 966, which can be arranged in layers similar to those of the local computing system 904, although the technologies that implement such layers at the remote computing system may be the same as, or different than, the technologies used in the local computing system. The local computing system 904 (and/or the remote computing system 960) can communicate with other remote computing systems 970, such as using the APIs/classes 950.

Example 11—Example Objects and Object Relationships

Figure 10:
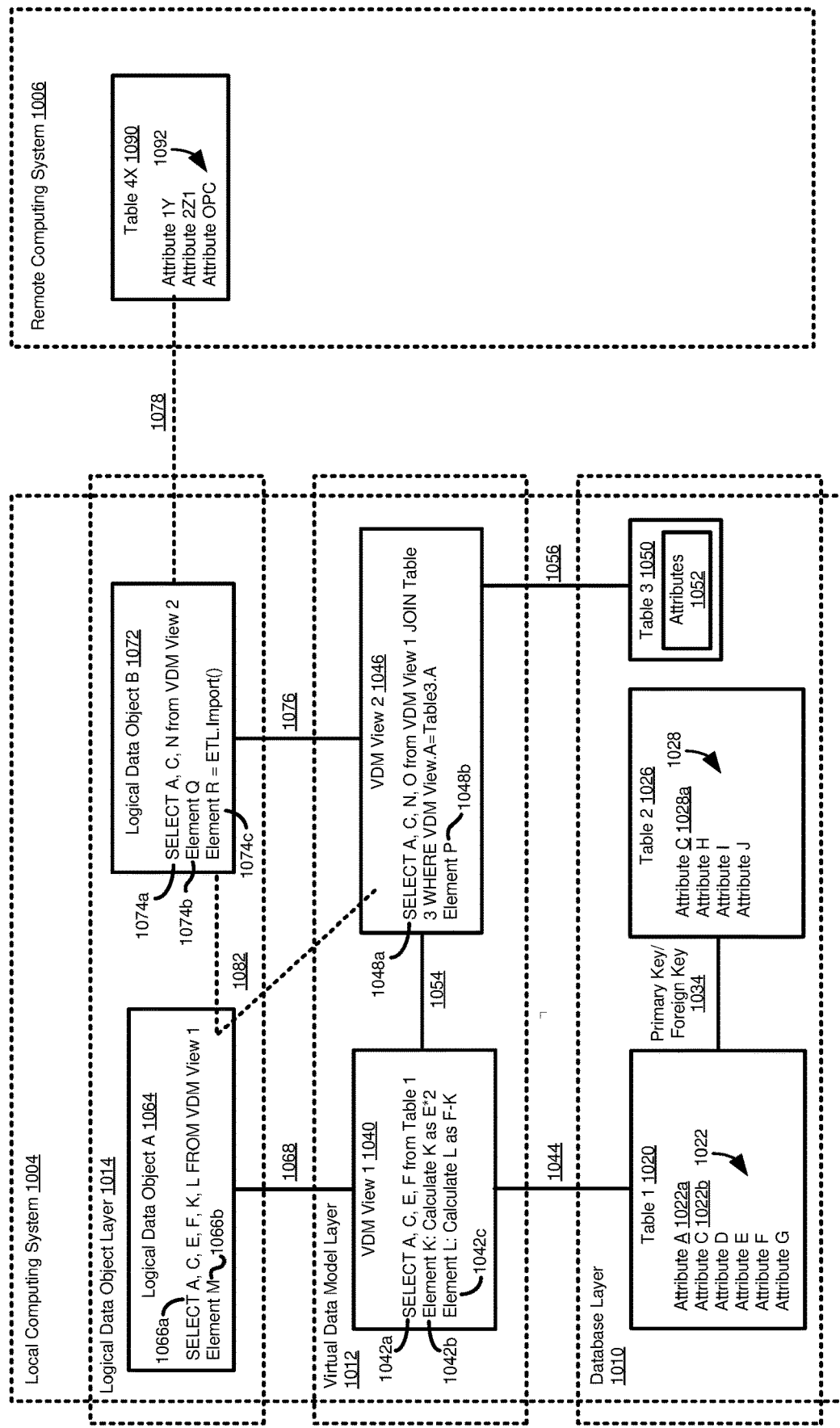
FIG. 10 is a diagram illustrating a set of related objects that can be modelled using disclosed techniques.

As will be further discussed, techniques of the present disclosure facilitate determining how changes to one object affect one or more related objects, including where the related objects may be related by defined relationships or inherent relations that are not natively tracked, or for which tracking is not easily accessible by, or accessible at all, to end users. Disclosed techniques achieve this benefit by modelling the related objects, where relationships can be defined between model objects, which are easier to "follow" and work with as compared with working directly with the modelled objects themselves. FIG. 10 illustrates an example set of related objects. This example set serves as the basis of a set of model objects that are discussed in FIG. 11 and Example 12.

The objects of FIG. 10 are located in a local computing system 1004 and a remote computing system 1006. The local computing system 1004 and the remote computing system 1006 can be analogous, in some implementations, to the local computing system 904 and the remote computing system 960 of FIG. 9. The local computing system 1004 includes a database layer 1010, a virtual data model layer 1012, and a logical data object layer 1014, which can be analogous to the correspondingly titled layers 910, 912, 914 of FIG. 9. However, rather than showing the relevant objects of the layers 910, 912, 914, generally, as in FIG. 9, FIG. 10 illustrates particular objects in each layer 1010, 1012, 1014, and particular relationships between such objects.

The database layer 1010 includes table 1 (1020) and table 2 (1026), having respective attribute (columns) 1022, 1028. Table 1 (1020) incudes an attribute A (1022*a*) that serves as a primary key, while table 2 (1026) has an attribute C (1028*a*) that serves as its primary key. Table 1 (1020) also includes attribute C, as attribute 1022*b*. The attributes 1028*a*, 1022*b* thus establish a primary key—foreign key relationship 1034 between the tables 1020, 1026. The relationship 1034 is an inherent relationship, since it is established by the definition of at least one object of the related objects. In this case, table 1 (1020) establishes the relationship 1034 through its reference to attribute 1028*a*.

The virtual data model layer 1012 includes view 1 (1040) and view 2 (1046). View 1 (1040) is in part defined with respect to table 1 (1020). In particular, view 1 (1040) includes a selection of data 1042*a*, in the form of particular attributes 1022 of table 1 (1020). View 1 (1040) also defines two new attributes 1042*b*, 1042*c*. Attribute 1042*b* is based on a calculation that includes one of the attributes 1022 of table 1 (1020), while attribute 1042*c* is based on a calculation that includes attribute 1042*b* and another of the attributes 1022. View 1 (1040) thus has several relationships with table 1 (1020), including relationships 1044 through the selection of data 1042*a* and the attributes 1042*b*, 1042*c*. Because table 1 (1020) is related to table 2 (1026) through the relationship 1034, view 1 (1040) is indirectly related to table 2. Because all of these relationships of view 1 (1040) are created by the definition of view 1, they are inherent relationships.

View 2 (1046) of the virtual data model layer 1012 is defined as a selection of data 1048*a* from view 1 (1040) and attributes 1052 of a table 3 (1050) of the database layer 1010. A new attribute 1048*b* is also defined for view 2 (1046), which is specific to/first defined in view 2. The selection of data 1048*a* establishes a relationship 1054 between view 2 (1046) and view 1 (1040), and a relationship 1056 between view 2 and table 3 (1050), through the JOIN condition of the selection of data 1048*a*. Because both of these relationships 1054, 1056 are established by the definition of view 2 (1046), they are inherent relationships.

The logical data object layer 1014 includes logical data object A (1064) and logical data object B (1072). Logical data object A (1064) includes a selection of data 1066*a* from view 1 (1040) and adds a new attribute 1066*b*. The selection of data 1066*a* defines a relationship 1068 between logical data object A (1064) and view 1 (1040), which is an inherent relationship because it is established by the definition of logical data object A.

Logical data object B (1072) includes a selection of data 1074*a*, that adds a new attribute 1074*b*, and specifies a method 1074*c* for importing data from the remote computing system 1006 (such as one or more attributes 1092 of a table 1090 of the remote computing system). The selection of data 1074*a* defines a relationship 1076, while the method 1074*c* defines a relationship 1078. The relationship 1076 is an inherent relationship, because it is defined in logical data object B (1072) and because it directly specifies the relationship and can be used to identify a type of relationship (that is, foreign key relationships may be considered as a different "type" than those established between various types of SELECT operations (where here "type" refers to a layer at which the SELECT occurs and the nature of the objects/layers targeted by the SELECT)).

The relationship 1078 is a defined relationship. Even though the method 1074*c* may be "included" in a definition of logical data object B, the method call does not identify what object it is related to or how it is related. Note that in some cases the method 1074*c* is not included the definition of logical data object B (1072), but rather can be an external method that results in the insertion of attributes/data values for the attribute for logical data object B. For example, consider a scenario where the method 1074*c* is "outside" of the definition of logical data object B (1072) and results in the attribute/values 1074*b*. Simply observing that attribute 1074*b* is in the definition of logical data object B (1072) would not reveal that in fact this attribute is related to an object in the remote computing system 1006.

A relationship 1082 exists between logical data object A (1064) and logical data object B (1072), given that both objects refer directly or indirectly to view 1 (1040). Although relationship 1082 can be considered an inherent relationship, since it is based on object definitions, it is not a kind of inherent relationship that is typically tracked by the layers 1012, 1014. The logical data object layer 1014, for example, may be configured to look for explicit relationships between logical data objects in the logical data object layer (that is, inherent relationships based on the logical data object definitions), and not querying the virtual data model layer 1012 or the database layer 1010 to look for more indirect relationships.

Example 12—Example Model and Model Objects

Figure 11:
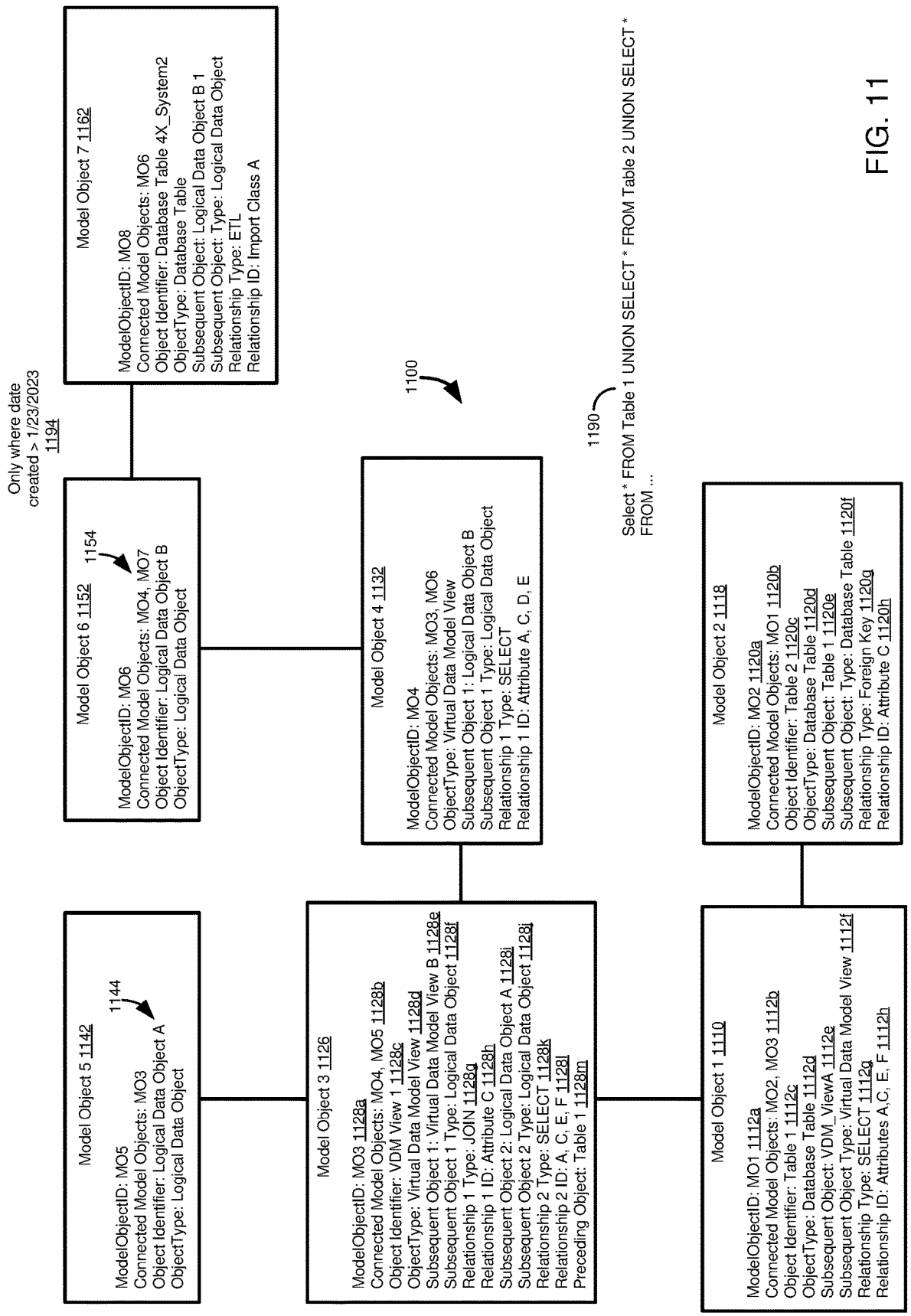
FIG. 11 is an example model of the objects of FIG. 10, including having model objects representing the objects of FIG. 10.

FIG. 11 illustrates how a model 1100 can represent various types of objects and their relationships, even for objects that are related by inherent relationships that are untracked, or if the objects have a defined relationship. The model 1100 is based on the objects and relationships of FIG. 10.

Before discussing the details of the model 1100, it may be useful to discuss aspects of model objects that define the model. A model object represents a particular object, such as an object in one of the layers 910, 912, 914 of FIG. 9. A model object typically identifies the object it represents, one or more objects to which it is related, and information about the nature of the object-object relationships. For example, if a first object is related to a second object because of a definition of the first object, a model object for the first object may include information identifying the second object and describing the relationship (such as relationship type, or a particular attribute that is used to define the relationship). In some cases, an object can maintain "two way" relationship information. Consider a view A that references a table B, where view A is referenced by view C. In some cases, view A references table B only, since view A "is based on" table B. View A may not "care" that is referenced by view C, since that is irrelevant to the definition of view A. However, in order to facilitate traversing relationships between model objects, a model object representing view A could indicate that it is related to a model object for table A and a model object for view C.

As discussed, the model object of the model 1100 represent the objects in FIG. 10. To simplify the figure, the various "layers" are not shown in FIG. 11, which also does not illustrate boundaries between a local computing system and a remote computing system. However, the omission of this information is also consistent with the definition of the model 1100, since a model 1100 typically is defined as a collection of model objects, where the model objects are all "flat"/at a common level, where information about "level"/"layer"/location information may be maintained in data for a model object, or can be obtained by accessing, for example, definitional information for an object represented by a model object.

The model objects can be instances of a class, or more generally an abstract or composite datatype. A model can be formed from model objects in a variety of ways, including arranging model object instances in an instance of a data structure, such as a tree, heap, or graph.

Turning now to the specific details illustrated in FIG. 11 for the model 1100, model object 1 (1110) represents table 1 (1020), while model object 2 (1118) represents table 2 (1026). A primary purpose of the model objects 1110, 1118 is to identify that the objects 1020, 1026 are related, and to provide information about the nature of the relationship. Accordingly, the model objects 1110, 1118 typically do not include detailed information about the objects 1020, 1026 they represent, such as the attributes that might be defined by the objects.

Since table 1 (1020) is defined with respect to table 2 (1026), a primary purpose of model object 1 (1110) is to easily allow it to be determined that changes to table 2 may impact data in table 1. Accordingly, model object 1110 includes a model object identifier attribute 1112a that provides a unique identifier for the model object 1110, and lists identifiers for all directly connected model objects as values for a connected model objects attribute 1112b. So, attribute 1112b lists the model object identifier value for model object 2 (1118), which corresponds to a value stored in the model object identifier attribute 1120a of model object 2. Since table 1 (1020) also has a relationship to view 1 (1040), the attribute 1112b also includes the value of the model object identifier attribute 1128a of a model object 3 (1126), representing view 1.

A model object can optionally include additional information about the object it represents, such as a type of the modeled object, where the type can indicate a layer in which the object is located, a particular type of object within a layer (for example, whether it is a table or view), or both. The type information can be useful, such as in defining operations to retrieve data for the object, or to determine how changes to another object might affect an object represented by a model object. In this case, an attribute 1112c identifies the object the model object 1110 represents, table 1 (1020), while attribute 1112d identifies the object as a database table.

As discussed, a model object can include information about how the object it represents is related to other objects. In the case of model object 1110, attribute 1112e identifies view 1 (1040) as a "subsequent object." In this case, a "subsequent object" refers to an object that may be impacted by a change to an object represented by the model object. If desired, in addition to, or in place of, having an identifier of a "subsequent object," a model object can include information about a relationship to a "preceding object," where a preceding object is an object whose changes might impact an object represented by a model object. Model object 1126 includes an attribute 1128m providing information about a preceding object.

In addition to identifying a subsequent object, a model object can include information about a type of subsequent object (or preceding object). As shown, model object 1110 has an attribute 1112f that indicates that the subsequent object of attribute 1112e is a view in a virtual data model. An attribute 1112g indicates a relationship type, in this case identifying that view 1 (1040) has a relationship with table 1 (1020) because view 1 defines a selection of data from table 1. Optionally, the model object 1110 can include additional information, such as the actual SELECT clause used in the definition of view 1 (1040), or identifying the particular attributes of table 1 (1020) that are included in the SELECT clause (as indicated in the values for attribute 1112h).

Model object 2 (1118) includes attributes 1120a-1120h that are generally similar to the attributes 1112a-1112h, but have values that are specific to the object represented by model object 2 (1118), table 2 (1026). In this case, table 2 (1026) is only connected to table 1 (1020), and so the connected model object identifier 1120b only lists model object 1 (1110), representing table 1. The value for the relationship type attribute 1120g is "foreign key," since that is the inherent relationship 1034, and attribute 1120h identifies that attribute as serving as the link (attribute C).

Model object 3 (1126), representing view 1 (1040), has attributes 1128a-1128m that provide similar information as the attributes 1112 and the attributes 1120. One difference in the attributes 1128 is that they include attributes 1128e-1128h for a first subsequent object (view 2 (1046)) and attributes 1128i-1128l for a second subsequent object (logical data object A (1064)). In addition, an attribute 1128m identifies table 1 (1020) as a preceding object (an object on which view 1 (1040) depends). Optionally, the attributes 1128 could include additional information about preceding objects, such as a type of object for table 1 (1020), an object type for table 1, a relationship type describing the relationship of table 1 and view 1 (1040), or details about the relationship (such as the attributes selected by view 1 from table 1).

FIG. 11 includes model objects 1132, 1142, 1152, 1162 that include attributes that are generally similar to the attributes 1112, 1120, 1128, but have values that reflect the objects they represent. Note that not all model objects need to include all possible attributes that are available for an instance of a model object type. For example, objects 1142, 1152 are not used in defining other objects, or otherwise impact other objects, and so their attributes 1144, 1154 need not include values for attributes that define subsequent objects (that is, the instances of the model object type can include data members/variable that represent subsequent objects, but where no value is provided, or a value is provided indicating that there are no subsequent objects/relationships).

Note that object/relationship information can be maintained in a manner other than illustrated in FIG. 11. For example, rather than model objects representing discrete objects, a model object could reflect a relationship between two objects—such as having a model object represent the relationship 1034 of FIG. 10. In this case the model object could store identifiers for table 1 (1020), table 2 (1026), and information describing the nature and details of the relationship 1034.

The model 1100 can be used in a variety of ways. In some cases, it may be useful to know what objects might be impacted by a change to another object. Say, for example, that data originating at view 2 (1046), represented by model object 4 (1132) is altered. The model 1100 can be used to identify that this change may impact logical data object B (1072), represented by model object 6 (1152). If instead data associated with table 2 (1026) is altered, analyzing the model would identify model object 1 (1110), model object 3 (1126), model object 4 (1132), model object (1142), and model object 6 (1152) as potentially impacted by the change, based on their relationships, direct or indirect, to model object 2 (1118).

If desired, data can be retrieved from impacted objects and analyzed to provide more specific details about the nature of changes, such as particular data values that may be associated with changes, or even quantifying the changes. A query can be formulated from the model objects and the underlying objects, such as using a "recursive" query that is performed by selecting data from the changed object and then traversing model objects of the model 1110 from a model object associated with the changed object to model objects connected to the changed object, and adding additional data selections for the additional objects.

Relationship information, as well as information about the type of the related objects, can be used in formulating queries. For example, one type of query may be needed to retrieve information from objects at a database layer, while another type of query may be needed to retrieve information from objects in a virtual data model. The resulting data set can then be pulled for analysis. In a more particular example, a data set not including the change can be retrieved and compared with a data set that is retrieved after making or simulating the change, where differences between the two data sets can be flagged/displayed to a user to provide information about the "impacts" of the input changes.

In a particular example, data from objects of the same layer or from different layers can be retrieved using JOIN or UNION operations. FIG. 11 illustrates a portion of a recursive query 1190 that might be generated in response to a change to table 2 (1026), represented by model object 1118.

In some cases, it may be desirable to limit an impact analysis in some way. For example, it may be known that only certain types of changes will be of interest. Limiting an impact can be useful in both reducing the processing load needed to conduct the analysis, and providing results that are more relevant/easier to understand or process. For instance, consider a scenario where a bill of materials is updated, which may affect inventory of components used to produce a product, as well as orders for that product. It may be of interest to only consider products or orders generated after a certain date. Or, it may be of interest to limit the analysis to a particular product that uses a component or to limit the analysis to a particular manufacturing facility. The limitations can be provided in the form of rules, or relationship conditions or "semantics," as illustrated by condition 1194, which restricts results to those being created after a certain date.

Conditions can be simple or complex, such as involving a single condition for a single attribute or including multiple conditions for one or multiple attributes. General operators that can be used in rules include where a value is equal to one or more specified values, is not equal to one or more specified values, is less than a particular value, or is greater than a particular value.

Example 13—Example Impact of Object Change

Figure 12:
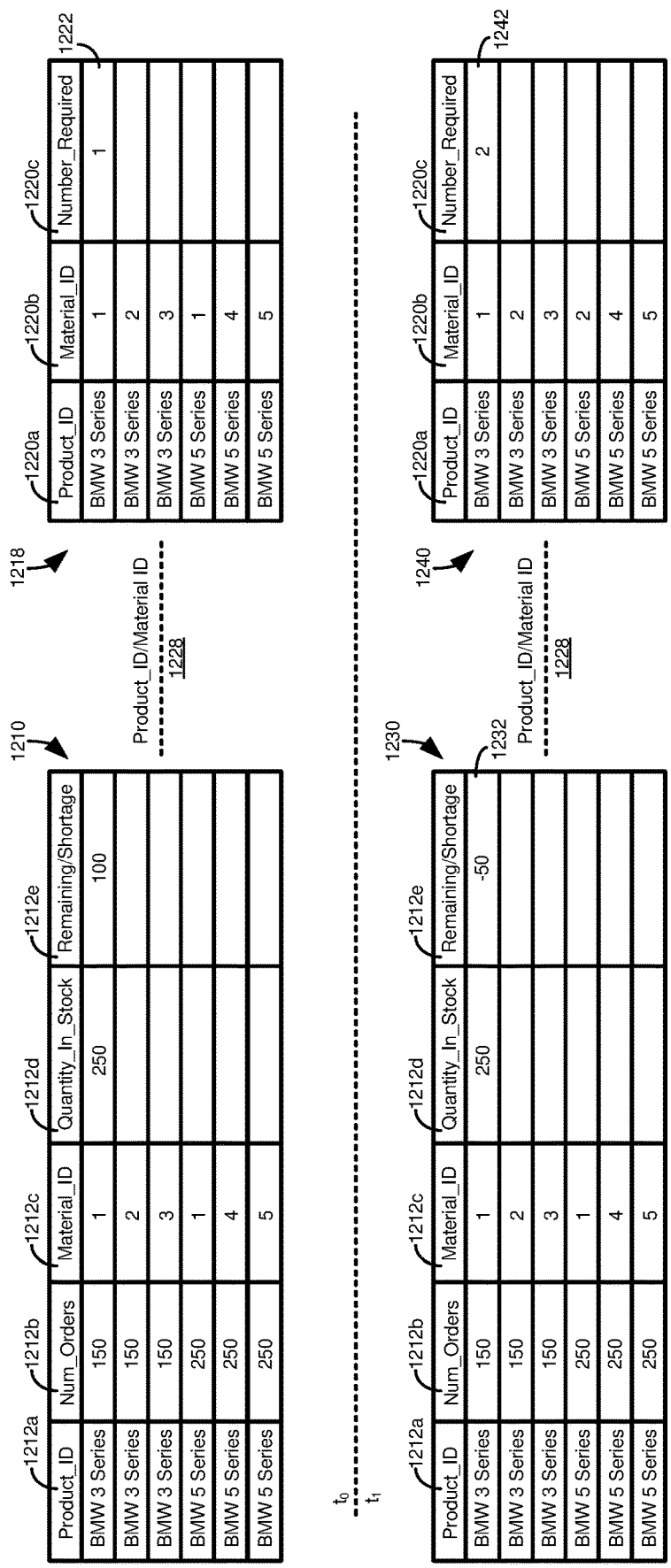
FIG. 12 provides example objects, in the form of tables, illustrating how a change to one object can impact another object.

FIG. 12 illustrates how a change to one object can affect other objects, and types of changes that can be detected using model objects of the present disclosure. FIG. 12 represents a manufacturing scenario where a table 1210 provides inventory and order information for various car models, and table 1218 reflects bills of materials for various car models. The bills of materials affect inventory status, in that if the number of units of a particular item in a bill of materials increases or decreases, whether there is a sufficient amount of the item in inventory to fulfill a particular set of orders can change. While described as tables, it should be appreciated that the tables 1210, 1218 in this case could represent data actually stored in database tables or materialized views, or which could be retrieved through a variety of objects, including database tables or views, objects in a virtual data model, logical data objects, or using a combination of these sources. Similarly, the tables 1210, 1218 can represent objects of the same type/at the same layer, or could be objects of different types/at different layers.

Table 1210 includes a variety of attributes/columns, including a column 1212a that provides a product identifier (in this case a particular car model or set of related car models), a column 1212b that provides a number of orders received for a particular car model, a column 1212c that lists material identifiers of particular materials that are used in producing a particular car model, a column 1212d that indicates an amount of a particular material (having the material identifier of column 1212c) that is currently in stock, and a column 1212e that indicates a quantity of the material that will remain available/in stock after the orders of column 1212b are fulfilled or, if the amount of the material in stock is not sufficient for the orders, an amount of stock shortage.

Table 1218 provides bill of materials information, and has a column 1220a that provides an identifier for a particular car model or set of related car models and a column 1220b that lists an identifier for a particular material used in producing the car model/set of models. The columns 1220a, 1220b can be analogous to the columns 1212a, 1212c. The columns 1220a, 1220b can serve as a primary key for the table 1218, and therefore the columns 1212a, 1212c can be foreign keys, establishing a primary key—foreign key relationship 1228. Column 1220*c* indicates a number of units of a material to be used in assembling a particular car model.

Now, considering a scenario where a bill of materials for a particular car model changes, resulting in a change to the information in the table 1218. For instance, assume that a design update is made to a steering column of a particular vehicle model, and the design update results in the use of two units of a particular electrical component when previously only a single unit was required. The initial situation is represented by row 1222 of table 1218. Tables 1230, 1240 are analogous to tables 1210, 1218, but represent updated values of both tables after the change to the number of required electrical components.

In particular, row 1242 of table 1240 illustrates that the value of column 1220*c* has ben updated from one to two for the electrical component represented by material identifier "1" (in column 1220*c* of table 1240). All other information in the table 1240 is identical to that in the table 1218.

Since the number of electrical components required for the car model (BMW 3 Series) has increased from one to two, it is reasonable to assume this affects the number of electrical components required to fulfill a set of orders, and that an amount of the component in inventory may not be sufficient to fulfill the orders given this change, or at least that fewer items would remain in inventory after the change. While in this example the change is fairly intuitive and easy to track, in practice the relationships between objects are such that it may be difficult for a human to mentally understand all the possible impacts of a change. Even if a human might understand some of the general types of changes/affected objects, it may be difficult for them to identify particular data of particular objects that might be affected by the change. As described, particularly when objects are not sufficiently linked, including in situations where existing programmatic logic does not exist to follow relationships between objects, or objects are sufficiently "distant" from one another, it can be difficult for a human or a computing process to fully capture the effects of a change to a particular object (where here the change refers to particular data for a particular object, but where the change could also be caused by a change to a particular definition of a particular object).

Returning to table 1230, row 1232 provides updated data values after the change to the table 1218. Instead of 150 electrical components being required, 300 are now required. Given the quantity in stock (250), which did not change between the initial time (t0) and the time of the update (ti), whereas previous satisfying the orders would result in a quantity of remaining electronic components of 100, a shortage of 50 is instead indicated.

Returning to the model 1100 of FIG. 11, or at least the general concepts illustrated using the model, a variety of information can be obtained using a model that includes objects that model the tables 1210, 1218. At a relatively simple level, making a change to table 1218 can be found to affect table 1210, and this information could be provided to a user or computing process. At an intermediate level, tracking data changes (such as using a recursive query/comparing values before and after a change is made) can indicate that the BMW 3 Series car model is impacted by the change. At a more complex level, information could be provided that a stock shortage will be encountered/a change to inventory levels has occurred, and optionally details about that change, such as the relative change in inventory levels or providing the original and updated values for the quantity of items remaining in inventory after fulfilling the orders. Other information could be provided by accessing additional objects, such as providing identifiers for the particular orders reflected in the tables 1210, 1230, or providing status information for such orders (such as whether they are currently released to production or are in a pending state).

Example 14—Example Computing Environment for Disclosed Technologies

Figure 13:
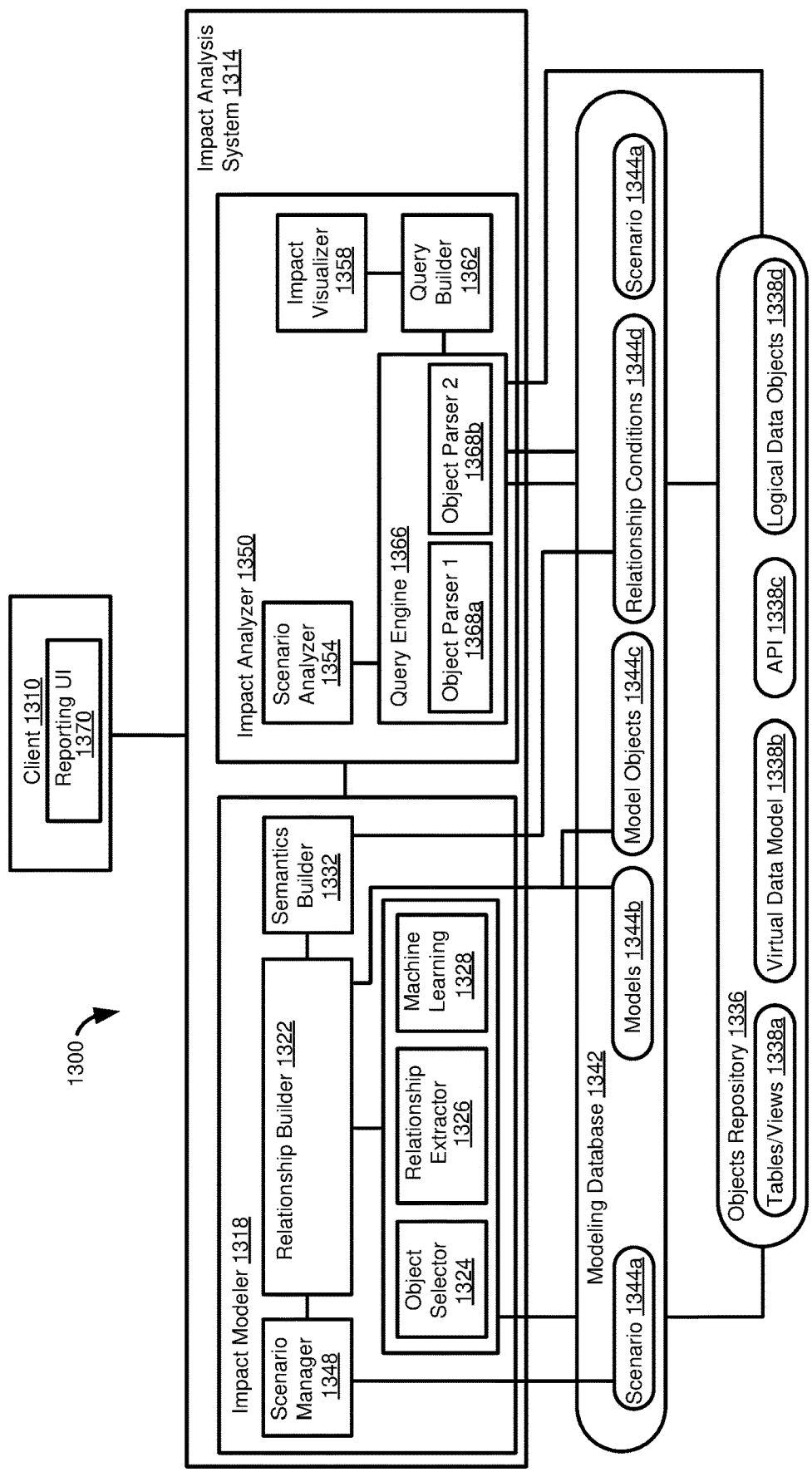
FIG. 13 is a diagram of an example computing system in which disclosed techniques can be implemented.

FIG. 13 provides an example computing environment 1300 that facilitates impact analysis. A client 1310 communicates with an impact analysis system 1314. The impact analysis system 1314 includes an impact modeler 1318. The impact modeler 1318 in turn includes a relationship builder 1322. The relationship builder 1322 receives input, such as from the client 1310, to create and manipulate models and model objects. As part of this process, the relationship builder 1322 can assist the user using various machine learning techniques, as will be further described.

The relationship builder 1322 can use the services of an object selector 1324, which can be used to retrieve information about objects from an objects repository 1336. The relationship builder 1322 can also use the services of a relationship extractor 1326, which can be used to extract information about objects, such as information about their elements/attributes or other definitional properties, including to determine if/how two objects might be related. The relationship extractor 1326 can also access information in the objects repository 1336.

In a specific example, the object selector 1324 and the relationship extractor 1326 can use information about various types of objects from the objects repository 1336, which can be implemented in a relational database system or in another manner. The objects repository 1336 can be a "native" source of object information, such as a data dictionary, information schema, or other source of model/schema information, or can be a repository that is specifically designed for use by the impact analysis system 1314. For example, the object repository 1336 can include functionality to parse data dictionaries, information schemas, or other sources of model/schema information, and to store the results in a centralized/standardized/consolidated manner. Among the types of information that can be stored in the object repository 1336 include information about tables and views (such as database tables and views) 1338*a*, information about objects in a virtual data model 1338*b*, information about APIs (or classes) 1338*c*, which can be the basis of "defined" relationships between objects, and information about logical data objects 1338*d*. The types of information that can be stored in the object repository 1326 can include object definitional information, such as information discussed in conjunction with FIG. 9 or 10, or in Examples 2-9.

One way the relationship extractor 1326 can use information in the objects repository 1336 is to assist users in establishing relationships between model objects. For example, if a user selects a first object to be modelled by a first model object, the relationship extractor 1326 can analyze information in the objects repository 1336 to suggest other objects that can be represented as a second model object and put in association with the first model object. As another example, if a user selects two model objects and their underlying objects to be connected, the relationship extractor 1326 can be used to suggest a particular relationship between the objects that can be used for the relationships between the model objects. That is, for example, objects in some cases can be related in multiple ways, such as having a selection, a calculation, and an association between two views in a virtual data model. For various purposes, such as for implementing a recursive query, it may be useful to specify a particular relationship to be used, both in terms of such information being needed to actually implement the query, and because in some cases difficult relationships can result in different data being retrieved in response to a query.

Because a repository may have many objects, and a given object may be related to many other objects, in a variety of ways, it may be useful to provide information to a user about the most likely objects to be connected to a given object (or more accurately, using their respective model objects), rather than providing a full list, or relying on the user to know such information. The relationship builder 1322 can use various techniques, such as machine learning techniques implemented using a machine learning component 1328, to assist in this process, such as using a random forest technique (or other type of decision tree) that uses information in the object repository 1336, and optionally information from other sources, such as other impact models, to select objects that are most likely to be connected, or a particular sequence for connecting them. As another example, the information in the objects repository 1336 can be used to train a classifier (such as using a neural network) that can receive an object as input and recommend one or more objects for connection. The machine learning component 1328 can communicate with one or more of the objects repository 1336, the object selector 1324, or the relationship extractor 1326.

The impact modeler 1318 can also include a semantics builder 1332. As described in Example 12, various conditions or rules (generally, "semantics") can be used to limit the scope of impacts of interest, such as limiting results to those satisfying particular values of one or more objects modelled by objects in a particular model. Typically, a user accesses the semantic builder 1332 to apply various rules to various object relations. As part of the process, the semantics builder 1332 can provide various information to a user, such as attributes in one or both of two connected objects, or even providing information about values that may be associated with various attributes. The semantics builder 1332 can also include rule templates and rule operators, such as allowing a user to set logical conditions such as whether a condition should or should not be true in order for impact results to be of interest, or for providing values that can serve as filter conditions.

The impact modeler 1318 can communicate with a modelling database 1342 which can store information about models. For instance, the modelling database 1342 may contain model definitions 1344*b*, in the form of a definition of model objects in the models and the relationships between them (including any semantics/rules/conditions relating the model objects), of individual model objects 1344*c* (where, for example, in some cases a given model object can be used in multiple models), or particular semantic information/relationships conditions 1344*d* (such as a particular rule that can optionally be used in multiple models).

The modelling database 1342 can also include scenarios 1344*a*. A scenario 1344*a* can represent a specific use case of a specific model, such as providing a particular change whose impact is to be determined. In another example, as scenario 1344*a* does not necessarily include a change, but includes other details that make a more general model 1344*b* more specific to a specific scenario, including where models 1344*b* are more general, and a scenario 1344*a* is a model along with one or more specific relationship conditions 1344*d*. Scenarios 1344*a* can be managed (including performing CRUD operations) using a scenario manager 1348 of the impact modeler 1318.

The models created using the impact modeler 1318 can be used by an impact analyzer 1350, where the impact analyzer can communicate with the impact modeler. The impact analyzer 1350 incudes a scenario analyzer 1354 that can access scenarios, or scenario components (such as models, model objects, semantic constraints) via the impact modeler 1318 or directly through the modelling database 1342. In an example, a user, such as a user of the client 1310, can submit an impact request to an impact visualizer component 1358 of the impact analyzer 1350. The request can identify a particular model or a particular scenario of interest, along with particular parameters, such as particular changes whose impact is to be determined or additional rules/conditions to be applied in determining an impact.

The request can be processed by a query builder 1362, which can, for example, determine generally what model objects of a model are relevant to the impact request. The query builder 1362 can communicate with a query engine 1366, which can include various object parsers 1368*a*, 1368*b* (and optionally additional object parsers) that can be used to formulate queries for specific types of objects (for example, queries to logical data objects, queries to virtual data model objects, queries to database objects, queries to objects in remote systems). The query engine 1366, or optionally the query builder 1362, can be responsible for constructing and executing, or causing the execution of, the query/query components, as well as collating the results. In constructing and executing the queries, the query engine 1366 can communicate with one or both of the modelling database 1342 and the objects repository 1336.

The impact visualizer 1358 can receive query results and generate visualizations that can be sent to the client 1310, where they can be displayed on a reporting and visualization user interface 1370.

Example 15—Example Impact Determination Process

Figure 14:
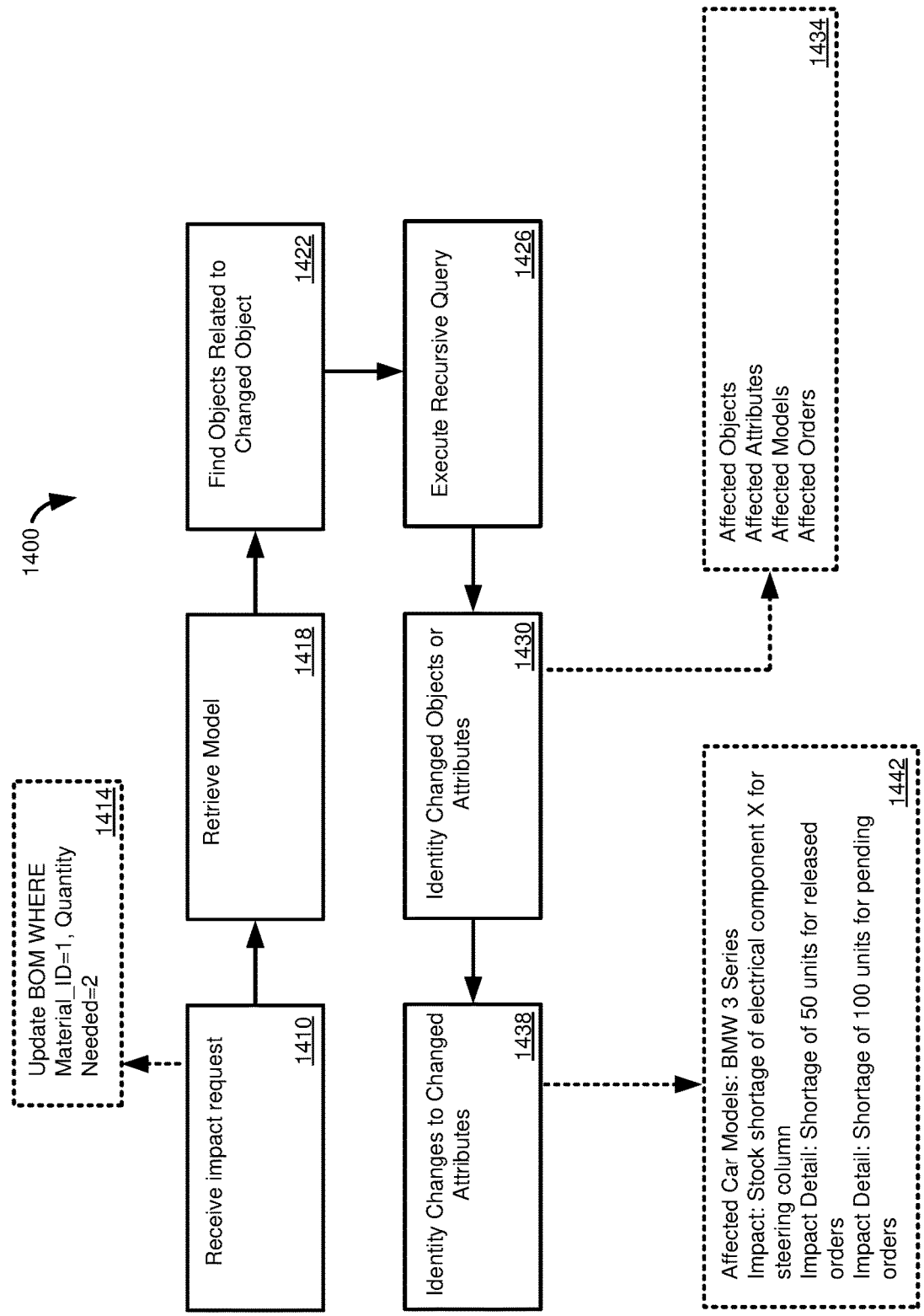
FIG. 14 is a flowchart of an example impact analysis process.

FIG. 14 illustrates an example process 1400 of using disclosed techniques to provide results for an impact request using an impact model. At 1410, an impact request is received. The impact request can specify a particular scenario that is to be executed, or can specify particular changes to be used, which will be associated with a particular model. The impact request can thus identify the scenario or model to be used. FIG. 14 illustrates elements 1414 of an impact request. The elements 1414 are consistent with the hypothetical scenario discussed in conjunction with FIG. 12, where a bill of materials is altered such that two electrical components are used when previously only one component was needed.

A model (or scenario) appropriate for the impact request is retrieved at 1418, such as using a model or scenario identifier provided in the impact request. In other cases, a scenario or model can be determined in another way, such as based on a particular software application through which the impact request was submitted, or determining the scenario or model based on a particular object identified in the impact request. Objects related to a changed object are identified at 1422, using the model and its constituent model objects. For related objects, a recursive query is generated and executed at 1426.

At 1430 changed objects or attributes are optionally identified. As discussed, an impact analysis can provide impact results at different granularities, including based on the nature of the model and model objects, the recursive query, and logic available for processing query results, as well as any user-selected options or configuration information associated with a scenario or impact visualization. Example information 1434 that can be generated, and optionally displayed, in conjunction with 1430 includes objects that are affected (such as particular database tables, such as identifying that table 1210 is affected by a change to table 1218) and general attributes that are affected by the change (such as the remaining/shortage attribute 1212*d*). More detailed attribute change or impact information can be provided. In the "electrical component" hypothetical scenario, this additional information can include particular car models that are affected or particular order numbers that are impacted by the change. That is, rather thus just identifying that a general "model" attribute is affected, "model" information would include identifying that "BMW 3 Series" is affected.

Even more granular impact information can optionally be provided at 1438. This information can include quantitative information about a change, as shown for the information 1442, again relating to the "electrical component" hypothetical. The information might include information precisely quantifying stock shortage information. Note that some of the information in an impact analysis, such as affected objects, can be determined solely from a model or solely by applying the change. Other information, such as the stock shortage, can be generated by executing a query without the change, executing a query with the change, and then comparing the results. In some cases, a scenario or visualization can include logic for processing information returned from one or more recursive queries to generate the information at 1434, 1438.

Example 15—Example Operations of Disclosed Techniques

Figure 15A:
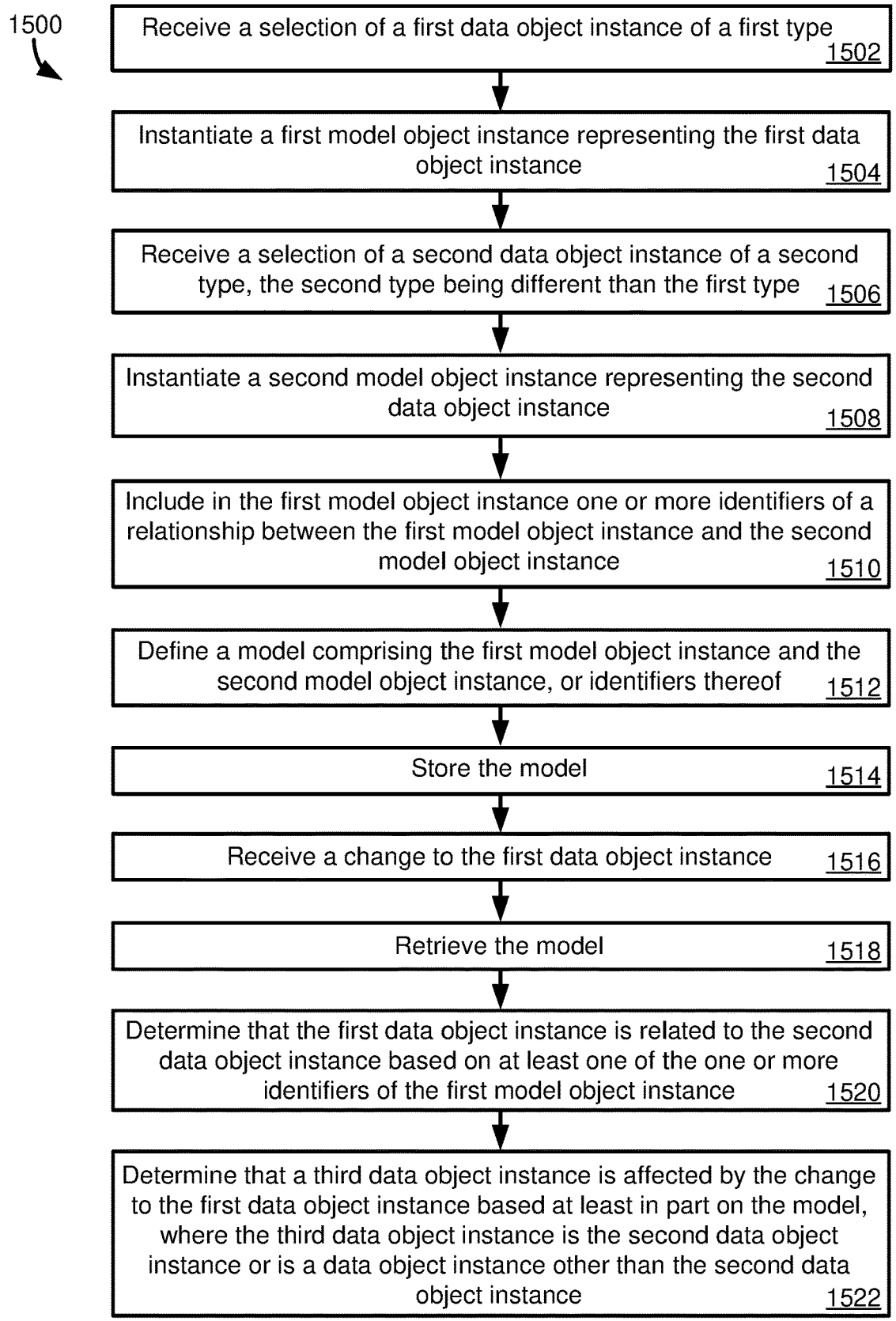
FIG. 15A is a flowchart of a process for identifying objects affected by a change to another object, using a model of a plurality objects.

FIG. 15A illustrates a method 1500 for identifying objects affected by a change to another object, using a model of a plurality objects. The method 1500 can be performed, in some implementations, using the computing environment 1300 of FIG. 13.

At 1502, a selection of a first data object instance of a first type is received. A first model object instance is instantiated at 1504, which represents the first data object instance. At 1506, a selection of a second data object instance of a second type is received, where the second type is different than the first type. A second model object instance, representing the second data object instance, is instantiated at 1508.

At 1510, one or more identifiers of a relationship between the first model object instance and the second model object instance are included in the first model object instance. A model that includes the first model object instance and the second model object instance, or identifiers thereof, is defined at 1512. At 1514, the model is stored.

A change to the first data object instance is received at 1516. The model is retrieved at 1518. At 1520, it is determined that the first data object instance is related to the second data object instance based on at least one of the one or more identifiers of the first model object instance. It is determined at 1522 that a third data object instance is affected by the change to the first data object instance based at least in part on the model, where the third data object instance is the second data object instance or is a data object instance other than the second data object instance.

Figure 15B:
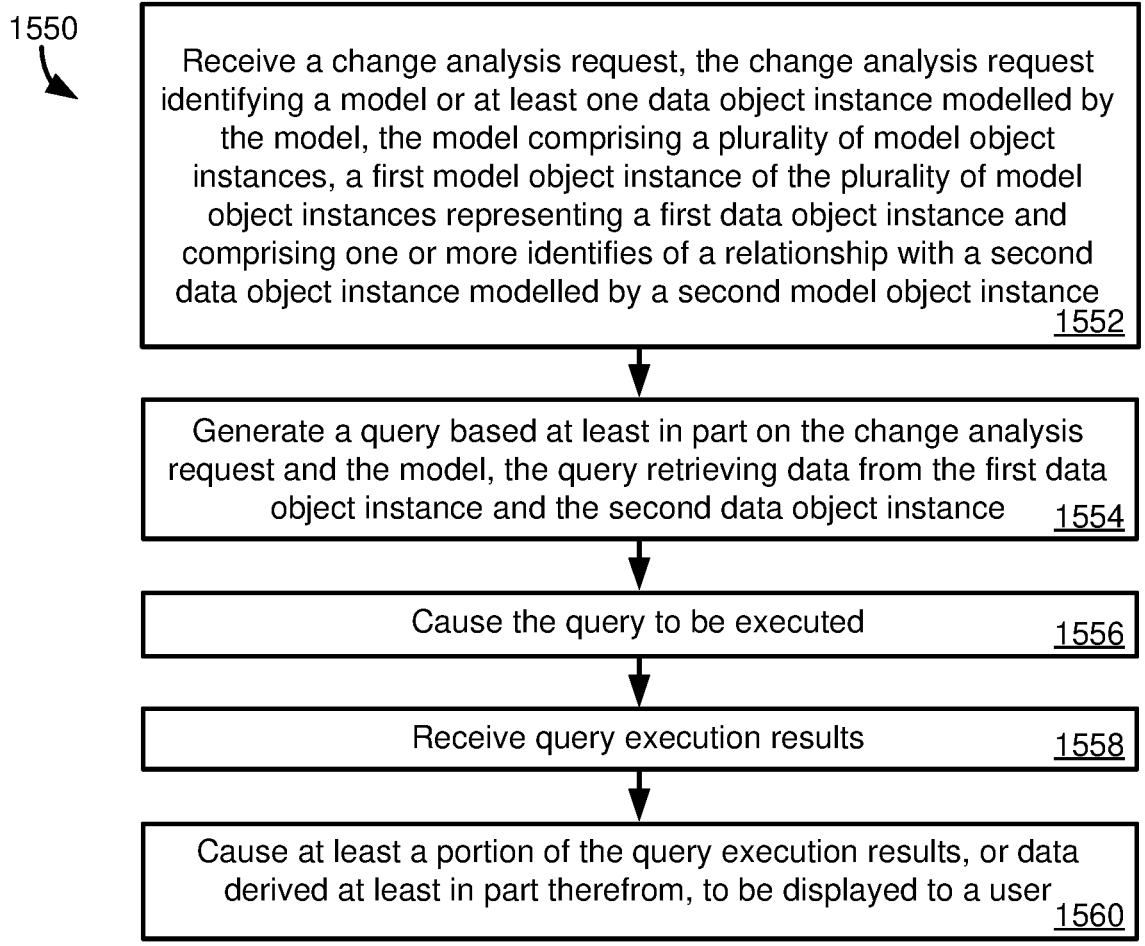
FIG. 15B is a flowchart of a method of processing a request to determine changes to one or more data objects based on a change to another data object, using a model having model object instances.

FIG. 15B illustrates a method 1550 of processing a request to determine changes to one or more data objects based on a change to another data object, using a model having model object instances. The method 1550 can be performed, in some implementations, using the computing environment 1300 of FIG. 13. At 1552, a change analysis request is received. The change analysis request identifies a model or at least one data object instance modelled by the model. The model includes a plurality of model object instances, a first model object instance of the plurality of model object instances representing a first data object instance and having one or more identifies of a relationship with a second data object instance modelled by a second model object instance.

A query is generated, at 1554, based at least in part on the change analysis request and the model, the query retrieving data from the first data object instance and the second data object instance. The query is caused to be executed at 1556, and query execution results are received at 1558. At least a portion of the query execution results, or data derived at least in part therefrom, are caused to be displayed to a user at 1560.

Example 16—Computing Systems

FIG. 16 depicts a generalized example of a suitable computing system 1600 in which the described innovations may be implemented. The computing system 1600 is not intended to suggest any limitation as to scope of use or functionality of the present disclosure, as the innovations may be implemented in diverse general-purpose or special-purpose computing systems.

With reference to FIG. 16, the computing system 1600 includes one or more processing units 1610, 1615 and memory 1620, 1625. In FIG. 16, this basic configuration 1630 is included within a dashed line. The processing units 1610, 1615 execute computer-executable instructions, such as for implementing components of the processes of the present disclosure. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 16 shows a central processing unit 1610 as well as a graphics processing unit or co-processing unit 1615. The tangible memory 1620, 1625 may be volatile memory (e.g., registers, cache, RAM), non-volatile memory (e.g., ROM, EEPROM, flash memory, etc.), or some combination of the two, accessible by the processing unit(s) 1610, 1615. The memory 1620, 1625 stores software 1680 implementing one or more innovations described herein, in the form of computer-executable instructions suitable for execution by the processing unit(s) 1610, 1615. The memory 1620, 1625, may also store settings or settings characteristics, databases, data sets, interfaces, displays, object instances, or model.

A computing system 1600 may have additional features. For example, the computing system 1600 includes storage 1640, one or more input devices 1650, one or more output devices 1660, and one or more communication connections 1670. An interconnection mechanism (not shown) such as a bus, controller, or network interconnects the components of the computing system 1600. Typically, operating system software (not shown) provides an operating environment for other software executing in the computing system 1600, and coordinates activities of the components of the computing system 1600.

The tangible storage 1640 may be removable or non-removable, and includes magnetic disks, magnetic tapes or cassettes, CD-ROMs, DVDs, or any other medium which can be used to store information in a non-transitory way, and which can be accessed within the computing system 1600. The storage 1640 stores instructions for the software 1680 implementing one or more innovations described herein.

The input device(s) 1650 may be a touch input device such as a keyboard, mouse, pen, or trackball, a voice input device, a scanning device, or another device that provides input to the computing system 1600. The output device(s) 1660 may be a display, printer, speaker, CD-writer, or another device that provides output from the computing system 1600.

The communication connection(s) 1670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 17—Cloud Computing Environment

Figure 17:
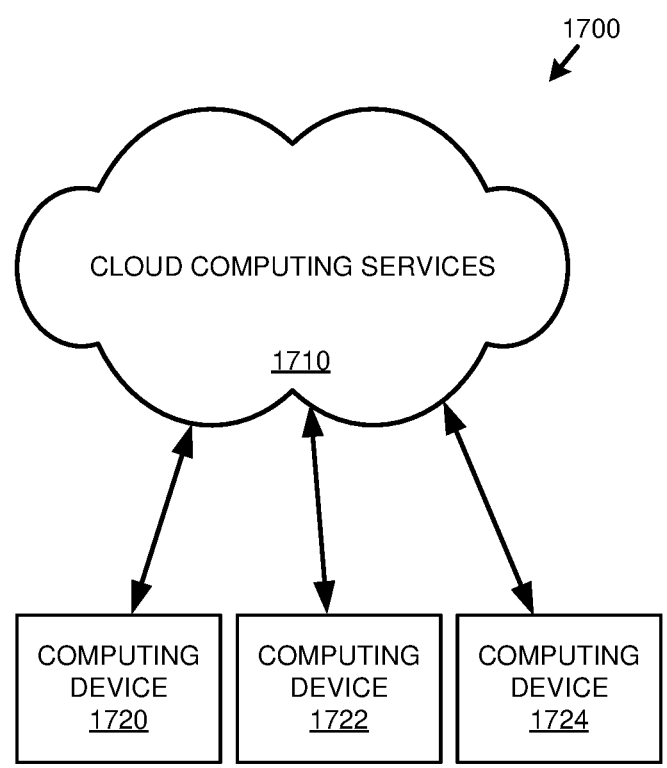
FIG. 17 is an example cloud computing environment that can be used in conjunction with the technologies described herein.

FIG. 17 depicts an example cloud computing environment 1700 in which the described technologies can be implemented. The cloud computing environment 1700 comprises cloud computing services 1710. The cloud computing services 1710 can comprise various types of cloud computing resources, such as computer servers, data storage repositories, networking resources, etc. The cloud computing services 1710 can be centrally located (e.g., provided by a data center of a business or organization) or distributed (e.g., provided by various computing resources located at different locations, such as different data centers and/or located in different cities or countries).

The cloud computing services 1710 are utilized by various types of computing devices (e.g., client computing devices), such as computing devices 1720, 1722, and 1724. For example, the computing devices (e.g., 1720, 1722, and 1724) can be computers (e.g., desktop or laptop computers), mobile devices (e.g., tablet computers or smart phones), or other types of computing devices. For example, the computing devices (e.g., 1720, 1722, and 1724) can utilize the cloud computing services 1710 to perform computing operations (e.g., data processing, data storage, and the like).

Example 18—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 16, computer-readable storage media include memory 1620 and 1625, and storage 1640. The term computer-readable storage media does not include signals and carrier waves. In addition, the term computer-readable storage media does not include communication connections (e.g., 1670).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
   receiving a selection of a first data object instance of a first type, the first data object instance comprising a first attribute;
   instantiating a first model object instance representing the first data object instance;
   receiving a selection of a second data object instance of a second type, the second type being different than the first type;
   instantiating a second model object instance representing the second data object instance;
   including in the first model object instance one or more identifiers of a relationship between the first model object instance and the second model object instance;
   defining a model comprising the first model object instance and the second model object instance, or identifiers thereof;
   storing the model;
   assigning a first value to the first attribute of the first instance of the first data instance;
   receiving a change to the first value of the first data object instance;
   retrieving the model;
   determining that the first data object instance is related to the second data object instance based on at least one of the one or more identifiers of the first model object instance;
   determining that a third data object instance has a value of a second attribute that is affected by the change to the first data object instance based at least in part on the model, where the third data object instance is the second data object instance or is a data object instance other than the second data object instance;
   determining an updated value of the second attribute based on the change to the first value; and
   returning the updated value.

2. The computing system of claim 1, wherein the first type is a database object and the second type is a data object of a virtual data model.

3. The computing system of claim 1, wherein the first data object instance and the second data object instance have a technical relationship.

4. The computing system of claim 1, wherein the first data object instance and the second data object instance have a defined relationship.

5. The computing system of claim 4, wherein the first data object instance and the second data object instance are located on independent computing systems.

6. The computing system of claim 4, wherein the first data object instance is located on a first computing system and the second data object instance is located on a second computing system that is remote from the first computing system.

7. The computing system of claim 1, the operations further comprising:
   defining a relationship condition between the first model object instance and the second model object instance, the relationship condition defining a condition or filter value to be used in executing a change analysis request.

8. The computing system of claim 1, wherein the one or more identifiers comprise an identifier of a relationship type between the first data object instance and the second data object instance.

9. The computing system of claim 1, wherein the one or more identifiers comprise an identifier of at least one definitional element of the first data object instance or the second data object instance that serves as a basis of the relationship.

10. The computing system of claim 1, the operations further comprising:
    receiving a first user selection of the first data object instance or the first model object instance;
    based on the first user selection, determining one or more data object instances that are related to the first data object instance, the one or more data object instances comprising the second data object instance; and
    receiving a second user selection of the second data object instance, wherein the instantiating the second model object instance is carried out based at least in part on the second user selection.

11. The computing system of claim 1, the operations further comprising:

receiving from a user a first user selection of the first data object instance or the first model object instance;

receiving a second user selection of the second data object instance;

determining one or more definitional elements of the first data object instance or the second data object instance that provide a relationship between the first data object instance and the second data object instance;

causing at least one of the one or more definitional elements to be displayed to the user;

receiving a third user selection of a definition element of the one or more definitional elements; and instantiating the second model object instance based at least in part on the third user selection or updating the second model object instance to include at least one of the one or more identifiers based at least in part on the third user selection.

12. The computing system of claim 1, the operations further comprising:

generating a query that retrieves data from the first data object instance and the second data object instance based at least in part on the first model object instance and the second model object instance.

13. The computing system of claim 12, the operations further comprising:

executing the query a first time prior to implementing the change to provide first execution results;

executing the query a second time after implementing the change to provide second execution results; and comparing the first execution results to the second execution results.

14. The computing system of claim 13, the operations further comprising:

causing at least a portion of the first execution results, or data derived at least in part therefrom, to be displayed to a user.

15. A method, implemented in a computing system comprising at least one hardware processor and at least one memory coupled to the at least one hardware processor, the method comprising:

receiving a change analysis request, the change analysis request identifying a model or at least one data object instance modelled by the model, the model comprising a plurality of model object instances, a first model object instance of the plurality of model object instances representing a first data object instance and comprising one or more identifies of a relationship with a second data object instance modelled by a second model object instance, wherein the change analysis request specifies a change to a first value assigned to a first attribute of the first data object instance;

updating a first value of a second attribute of the second data object instance based on the change to the first value;

generating a query based at least in part on the change analysis request and the model, the query retrieving data from the first data object instance and the second data object instance;

causing the query to be executed;

receiving query execution results; and causing at least a portion of the query execution results, or data derived at least in part therefrom, to be displayed to a user.

16. The method of claim 15, wherein the first data object instance is of a first type and the second data object instance is of a second type different than the first type.

17. The method of claim 15, wherein the first data object instance is a database table or a database view and the second data object instance is an object in a virtual data model or where the first data object instance is a data object in a virtual data model and the second data object instance is a logical data object.

18. The method of claim 15, wherein the first data object instance and the second data object instance have an inherent relationship.

19. The method of claim 15, wherein the first data object instance and the second data object instance have a defined relationship.

20. One or more computer-readable storage media comprising:

computer-executable instructions that, when executed by a computing system comprising at least one hardware processor and at least one memory coupled to the at least one hardware processor, cause the computing system to receive a selection of a first data object instance of a first type, the first data object instance comprising a first attribute;

computer-executable instructions that, when executed by the computing system, cause the computing system to instantiate a first model object instance representing the first data object instance;

computer-executable instructions that, when executed by the computing system, cause the computing system to receive a selection of a second data object instance of a second type, the second type being different than the first type;

computer-executable instructions that, when executed by the computing system, cause the computing system to instantiate a second model object instance representing the second data object instance;

computer-executable instructions that, when executed by the computing system, cause the computing system to include in the first model object instance one or more identifiers of a relationship between the first model object instance and the second model object instance;

computer-executable instructions that, when executed by the computing system, cause the computing system to define a model comprising the first model object instance and the second model object instance, or identifiers thereof;

computer-executable instructions that, when executed by the computing system, cause the computing system to store the model;

computer-executable instructions that, when executed by the computing system, cause the computing system to assign a first value to the first attribute of the first instance of the first data object instance;

computer-executable instructions that, when executed by the computing system, cause the computing system to receive a change to the first value of the first data object instance;

computer-executable instructions that, when executed by the computing system, cause the computing system to retrieve the model;

computer-executable instructions that, when executed by the computing system, cause the computing system to determine that the first data object instance is related to the second data object instance based on at least one of the one or more identifiers of the first model object instance;

computer-executable instructions that, when executed by the computing system, cause the computing system to determine that a third data object instance has a value of a second attribute that is affected by the change to the first data object instance based at least in part on the model, where the third data object instance is the second data object instance or is a data object instance other than the second data object instance;

computer-executable instructions that, when executed by the computing system, cause the computing system to determine an updated value of the second attribute based on the change to the first value; and computer-executable instructions that, when executed by the computing system, cause the computing system to return the updated value.

\* \* \* \* \*